United States Patent
Alperovitch et al.

(10) Patent No.: US 8,185,930 B2
(45) Date of Patent: May 22, 2012

(54) ADJUSTING FILTER OR CLASSIFICATION CONTROL SETTINGS

(75) Inventors: Dmitri Alperovitch, Atlanta, GA (US); Paula Greve, Lino Lakes, MN (US); Sven Krasser, Atlanta, GA (US); Tomo Foote-Lennox, Maple Grove, MN (US)

(73) Assignee: McAfee, Inc., Santa Clara, CA (US)

( * ) Notice: Subject to any disclaimer, the term of this patent is extended or adjusted under 35 U.S.C. 154(b) by 1061 days.

(21) Appl. No.: 11/935,756

(22) Filed: Nov. 6, 2007

(65) Prior Publication Data

US 2009/0119740 A1    May 7, 2009

(51) Int. Cl.
*G06F 17/00* (2006.01)
(52) U.S. Cl. .......... 726/1; 726/22; 726/24; 713/154; 713/161; 380/232; 380/255; 709/206
(58) Field of Classification Search .......... 726/1, 22, 726/24; 713/154, 161; 709/206; 380/232, 380/255
See application file for complete search history.

(56) References Cited

U.S. PATENT DOCUMENTS

| | | |
|---|---|---|
| 4,289,930 A | 9/1981 | Connolly et al. |
| 4,384,325 A | 5/1983 | Slechta et al. |
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |

(Continued)

FOREIGN PATENT DOCUMENTS

CA    2564533    12/2005

(Continued)

OTHER PUBLICATIONS

Richard Segal, SpamGuru: An Enterprise Anti-Spam Filtering System; Year: 2004; IBM; pp. 1-7.*

(Continued)

*Primary Examiner* — April Shan
(74) *Attorney, Agent, or Firm* — Fish & Richardson P.C.

(57) ABSTRACT

Methods and systems for adjusting control settings associated with filtering or classifying communications to a computer or a network. The adjustment of the control settings can include adjustment of policy and/or security settings associated with the computer or network. Ranges associated with the control settings can also be provided in some implementations.

22 Claims, 11 Drawing Sheets

U.S. PATENT DOCUMENTS

| | | |
|---|---|---|
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,836 A | 4/1999 | Freivald et al. |
| 5,903,723 A | 5/1999 | Beck et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A | 12/2000 | Horvitz et al. |
| 6,185,689 B1 | 2/2001 | Todd, Sr. et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,269,447 B1 | 7/2001 | Maloney et al. |
| 6,269,456 B1 | 7/2001 | Hodges et al. |

| | | | | | | |
|---|---|---|---|---|---|---|
| 6,272,532 B1 | 8/2001 | Feinleib | | 2001/0049793 A1 | 12/2001 | Sugimoto |
| 6,275,942 B1 | 8/2001 | Bernhard et al. | | 2002/0004902 A1 | 1/2002 | Toh et al. |
| 6,279,113 B1 | 8/2001 | Vaidya | | 2002/0016910 A1 | 2/2002 | Wright et al. |
| 6,279,133 B1 | 8/2001 | Vafai et al. | | 2002/0023140 A1 | 2/2002 | Hile et al. |
| 6,282,565 B1 | 8/2001 | Shaw et al. | | 2002/0026591 A1 | 2/2002 | Hartley et al. |
| 6,285,991 B1 | 9/2001 | Powar | | 2002/0032871 A1 | 3/2002 | Malan et al. |
| 6,289,214 B1 | 9/2001 | Backstrom | | 2002/0035683 A1 | 3/2002 | Kaashoek et al. |
| 6,298,445 B1 | 10/2001 | Shostack et al. | | 2002/0042876 A1 | 4/2002 | Smith |
| 6,301,668 B1 | 10/2001 | Gleichauf et al. | | 2002/0046041 A1 | 4/2002 | Lang |
| 6,304,898 B1 | 10/2001 | Shiigi | | 2002/0049853 A1 | 4/2002 | Chu et al. |
| 6,304,973 B1 | 10/2001 | Williams | | 2002/0078382 A1 | 6/2002 | Sheikh et al. |
| 6,311,207 B1 | 10/2001 | Mighdoll et al. | | 2002/0087882 A1 | 7/2002 | Schneier et al. |
| 6,317,829 B1 | 11/2001 | Van Oorschot | | 2002/0095492 A1 | 7/2002 | Kaashoek et al. |
| 6,320,948 B1 | 11/2001 | Heilmann et al. | | 2002/0112185 A1 | 8/2002 | Hodges |
| 6,321,267 B1 | 11/2001 | Donaldson | | 2002/0116627 A1 | 8/2002 | Tarbotton et al. |
| 6,324,569 B1 | 11/2001 | Ogilvie et al. | | 2002/0120853 A1 | 8/2002 | Tyree |
| 6,324,647 B1 | 11/2001 | Bowman-Amuah | | 2002/0133365 A1 | 9/2002 | Grey et al. |
| 6,324,656 B1 | 11/2001 | Gleichauf et al. | | 2002/0138416 A1 | 9/2002 | Lovejoy et al. |
| 6,330,589 B1 | 12/2001 | Kennedy | | 2002/0138755 A1 | 9/2002 | Ko |
| 6,347,374 B1 | 2/2002 | Drake et al. | | 2002/0138759 A1 | 9/2002 | Dutta |
| 6,353,886 B1 | 3/2002 | Howard et al. | | 2002/0138762 A1 | 9/2002 | Horne |
| 6,363,489 B1 | 3/2002 | Comay et al. | | 2002/0143963 A1 | 10/2002 | Converse et al. |
| 6,370,648 B1 | 4/2002 | Diep | | 2002/0147734 A1 | 10/2002 | Shoup et al. |
| 6,373,950 B1 | 4/2002 | Rowney | | 2002/0152399 A1 | 10/2002 | Smith |
| 6,385,655 B1 | 5/2002 | Smith et al. | | 2002/0165971 A1 | 11/2002 | Baron |
| 6,393,465 B2 | 5/2002 | Leeds | | 2002/0172367 A1 | 11/2002 | Mulder et al. |
| 6,393,568 B1 | 5/2002 | Ranger et al. | | 2002/0178227 A1 | 11/2002 | Matsa et al. |
| 6,405,318 B1 | 6/2002 | Rowland | | 2002/0178383 A1 | 11/2002 | Hrabik et al. |
| 6,442,588 B1 | 8/2002 | Clark et al. | | 2002/0188864 A1 | 12/2002 | Jackson |
| 6,442,686 B1 | 8/2002 | McArdle et al. | | 2002/0194469 A1 | 12/2002 | Dominique et al. |
| 6,453,345 B2 | 9/2002 | Trcka et al. | | 2002/0199095 A1 | 12/2002 | Bandini et al. |
| 6,460,141 B1 | 10/2002 | Olden | | 2003/0005326 A1 | 1/2003 | Flemming |
| 6,470,086 B1 | 10/2002 | Smith | | 2003/0009554 A1 | 1/2003 | Burch et al. |
| 6,487,599 B1 | 11/2002 | Smith et al. | | 2003/0009693 A1 | 1/2003 | Brock et al. |
| 6,487,666 B1 | 11/2002 | Shanklin et al. | | 2003/0009696 A1 | 1/2003 | Bunker et al. |
| 6,502,191 B1 | 12/2002 | Smith et al. | | 2003/0009699 A1 | 1/2003 | Gupta et al. |
| 6,516,411 B2 | 2/2003 | Smith | | 2003/0014664 A1 | 1/2003 | Hentunen |
| 6,519,703 B1 | 2/2003 | Joyce | | 2003/0023692 A1 | 1/2003 | Moroo |
| 6,539,430 B1 | 3/2003 | Humes | | 2003/0023695 A1 | 1/2003 | Kobata et al. |
| 6,546,416 B1 | 4/2003 | Kirsch | | 2003/0023873 A1 | 1/2003 | Ben-Itzhak |
| 6,546,493 B1 | 4/2003 | Magdych et al. | | 2003/0023874 A1 | 1/2003 | Prokupets et al. |
| 6,550,012 B1 | 4/2003 | Villa et al. | | 2003/0023875 A1 | 1/2003 | Hursey et al. |
| 6,574,737 B1 | 6/2003 | Kingsford et al. | | 2003/0028803 A1 | 2/2003 | Bunker et al. |
| 6,578,025 B1 | 6/2003 | Pollack et al. | | 2003/0033516 A1 | 2/2003 | Howard et al. |
| 6,609,196 B1 | 8/2003 | Dickinson, III et al. | | 2003/0033542 A1 | 2/2003 | Goseva-Popstojanova et al. |
| 6,650,890 B1 | 11/2003 | Iriam et al. | | 2003/0041264 A1 | 2/2003 | Black et al. |
| 6,654,787 B1 | 11/2003 | Aronson et al. | | 2003/0051026 A1 | 3/2003 | Carter et al. |
| 6,675,153 B1 | 1/2004 | Cook et al. | | 2003/0051163 A1 | 3/2003 | Bidaud |
| 6,681,331 B1 | 1/2004 | Munson et al. | | 2003/0051168 A1 | 3/2003 | King et al. |
| 6,687,687 B1 | 2/2004 | Smadja | | 2003/0055931 A1 | 3/2003 | Cravo De Almeida et al. |
| 6,697,950 B1 | 2/2004 | Ko | | 2003/0061506 A1 | 3/2003 | Cooper et al. |
| 6,701,440 B1 | 3/2004 | Kim et al. | | 2003/0065943 A1 | 4/2003 | Geis et al. |
| 6,704,874 B1 | 3/2004 | Porras et al. | | 2003/0084280 A1 | 5/2003 | Bryan et al. |
| 6,711,127 B1 | 3/2004 | Gorman et al. | | 2003/0084320 A1 | 5/2003 | Tarquini et al. |
| 6,725,377 B1 | 4/2004 | Kouznetsov | | 2003/0084323 A1 | 5/2003 | Gales |
| 6,732,101 B1 | 5/2004 | Cook | | 2003/0084347 A1 | 5/2003 | Luzzatto |
| 6,732,157 B1 | 5/2004 | Gordon et al. | | 2003/0088792 A1 | 5/2003 | Card et al. |
| 6,735,703 B1 | 5/2004 | Kilpatrick et al. | | 2003/0093667 A1 | 5/2003 | Dutta et al. |
| 6,738,462 B1 | 5/2004 | Brunson | | 2003/0093695 A1 | 5/2003 | Dutta |
| 6,742,124 B1 | 5/2004 | Kilpatrick et al. | | 2003/0093696 A1 | 5/2003 | Sugimoto |
| 6,742,128 B1 | 5/2004 | Joiner | | 2003/0095555 A1 | 5/2003 | McNamara et al. |
| 6,754,705 B2 | 6/2004 | Joiner et al. | | 2003/0097439 A1 | 5/2003 | Strayer et al. |
| 6,757,830 B1 | 6/2004 | Tarbotton et al. | | 2003/0097564 A1 | 5/2003 | Tewari et al. |
| 6,768,991 B2 | 7/2004 | Hearnden | | 2003/0105976 A1 | 6/2003 | Copeland, III |
| 6,769,016 B2 | 7/2004 | Rothwell et al. | | 2003/0110392 A1 | 6/2003 | Aucsmith et al. |
| 6,775,657 B1 | 8/2004 | Baker | | 2003/0110396 A1 | 6/2003 | Lewis et al. |
| 6,792,546 B1 | 9/2004 | Shanklin et al. | | 2003/0115485 A1 | 6/2003 | Milliken |
| 6,892,178 B1 | 5/2005 | Zacharia | | 2003/0115486 A1 | 6/2003 | Choi et al. |
| 6,892,179 B1 | 5/2005 | Zacharia | | 2003/0123665 A1 | 7/2003 | Dunstan et al. |
| 6,892,237 B1 | 5/2005 | Gai et al. | | 2003/0126464 A1 | 7/2003 | McDaniel et al. |
| 6,895,385 B1 | 5/2005 | Zacharia et al. | | 2003/0126472 A1 | 7/2003 | Banzhof |
| 6,907,430 B2 | 6/2005 | Chong et al. | | 2003/0135749 A1 | 7/2003 | Gales et al. |
| 6,910,135 B1 | 6/2005 | Grainger | | 2003/0140137 A1 | 7/2003 | Joiner et al. |
| 6,928,556 B2 | 8/2005 | Black et al. | | 2003/0140250 A1 | 7/2003 | Taninaka et al. |
| 6,941,348 B2 * | 9/2005 | Petry et al. ............... 709/206 | | 2003/0145212 A1 | 7/2003 | Crumly |
| 6,941,467 B2 | 9/2005 | Judge et al. | | 2003/0145225 A1 | 7/2003 | Bruton, III et al. |
| 6,968,461 B1 | 11/2005 | Lucas et al. | | 2003/0145226 A1 | 7/2003 | Bruton, III et al. |
| 7,272,149 B2 | 9/2007 | Bly et al. | | 2003/0149887 A1 | 8/2003 | Yadav |
| 7,647,411 B1 * | 1/2010 | Schiavone et al. ............ 709/229 | | 2003/0149888 A1 | 8/2003 | Yadav |

| | | |
|---|---|---|
| 2003/0152096 A1 | 8/2003 | Chapman |
| 2003/0154393 A1 | 8/2003 | Young |
| 2003/0154399 A1 | 8/2003 | Zuk et al. |
| 2003/0154402 A1 | 8/2003 | Pandit et al. |
| 2003/0158905 A1 | 8/2003 | Petry et al. |
| 2003/0159069 A1 | 8/2003 | Choi et al. |
| 2003/0159070 A1 | 8/2003 | Mayer et al. |
| 2003/0167402 A1 | 9/2003 | Stolfo et al. |
| 2003/0172166 A1 | 9/2003 | Judge et al. |
| 2003/0172167 A1 | 9/2003 | Judge et al. |
| 2003/0172289 A1 | 9/2003 | Soppera |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2003/0187996 A1 | 10/2003 | Cardina et al. |
| 2003/0212791 A1 | 11/2003 | Pickup |
| 2003/0233328 A1 | 12/2003 | Scott et al. |
| 2004/0015554 A1 | 1/2004 | Wilson |
| 2004/0025044 A1 | 2/2004 | Day |
| 2004/0054886 A1 | 3/2004 | Dickinson et al. |
| 2004/0058673 A1 | 3/2004 | Iriam et al. |
| 2004/0059811 A1 | 3/2004 | Sugauchi et al. |
| 2004/0088570 A1 | 5/2004 | Roberts et al. |
| 2004/0111531 A1 | 6/2004 | Staniford et al. |
| 2004/0139160 A1 | 7/2004 | Wallace et al. |
| 2004/0139334 A1 | 7/2004 | Wiseman |
| 2004/0177120 A1 | 9/2004 | Kirsch |
| 2004/0203589 A1 | 10/2004 | Wang et al. |
| 2004/0205135 A1 | 10/2004 | Hallam-Baker |
| 2004/0267893 A1 | 12/2004 | Lin |
| 2005/0021738 A1 | 1/2005 | Goeller |
| 2005/0052998 A1 | 3/2005 | Oliver et al. |
| 2005/0065810 A1 | 3/2005 | Bouron |
| 2005/0102366 A1* | 5/2005 | Kirsch ........................... 709/207 |
| 2005/0262209 A1 | 11/2005 | Yu |
| 2005/0262210 A1 | 11/2005 | Yu |
| 2006/0015563 A1* | 1/2006 | Judge et al. .................... 709/206 |
| 2006/0036727 A1 | 2/2006 | Kurapati et al. |
| 2006/0042483 A1 | 3/2006 | Work et al. |
| 2006/0095404 A1 | 5/2006 | Adelman et al. |
| 2006/0123083 A1 | 6/2006 | Goutte et al. |
| 2006/0191002 A1 | 8/2006 | Lee et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0230039 A1 | 10/2006 | Shull et al. |
| 2006/0253458 A1* | 11/2006 | Dixon et al. ..................... 707/10 |
| 2007/0199070 A1 | 8/2007 | Hughes |
| 2007/0233787 A1* | 10/2007 | Pagan ........................... 709/206 |

FOREIGN PATENT DOCUMENTS

| | | |
|---|---|---|
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1271846 | 7/2005 |
| GB | 2271002 | 3/1994 |
| JP | 18350870 | 12/2006 |
| KR | 10-0447082 B1 | 9/2004 |
| KR | 2006-0012137 | 2/2006 |
| KR | 10-2006-0028200 A | 3/2006 |
| KR | 1020060041934 | 5/2006 |
| KR | 10-0699531 B1 | 3/2007 |
| KR | 10-0737523 B1 | 7/2007 |
| KR | 10-0750377 B1 | 8/2007 |
| WO | WO 96/35994 | 11/1996 |
| WO | WO 99/05814 | 2/1999 |
| WO | WO 99/33188 | 7/1999 |
| WO | WO 99/37066 | 7/1999 |
| WO | 00/08543 A1 | 2/2000 |
| WO | WO 00/42748 | 7/2000 |
| WO | WO 01/17165 | 3/2001 |
| WO | WO 01/50691 | 7/2001 |
| WO | WO 01/76181 | 10/2001 |
| WO | WO 02/13469 | 2/2002 |
| WO | WO 02/13489 | 2/2002 |
| WO | WO 02/75547 | 9/2002 |
| WO | WO 02/091706 | 11/2002 |
| WO | WO 2004/061703 | 7/2004 |
| WO | WO 2004/081734 | 9/2004 |
| WO | WO 2005/116851 | 12/2005 |

OTHER PUBLICATIONS

Article entitled "Securing Electronic Mail Systems" by Serenelli et al., in *Communications-Fusing Command Control and Intelligence: MILCOM '92*, 1992, pp. 677-680.

Article entitled "Integralis' Minesweeper defuses E-mail bombs" by Kramer et. al., in *PC Week*, Mar. 18, 1996, p. N17-N23.

Article entitled "A Toolkit and Methods for Internet Firewalls" by Ranum et. al., in *Proc. of USENIX Summer 1994 Technical Conference*, Jun. 6-10, 1994, pp. 37-44.

Article entitled "Firewall Systems: The Next Generation" by McGhie, in *Integration Issues in Large Commercial Media Delivery Systems: Proc. of SPIE—The International Society for Optical Engineering*, Oct. 23-24, 1995, pp. 270-281.

Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.

Article entitled "Designing an Academic Firewall: Policy, Practice, and Experience with SURF" by Greenwald et. al., in *Proc. of the 1996 Symposium on Network and Distributed Systems Security*, 1996, pp. 1-14.

Article entitled "X Through the Firewall, and Other Application Relays" by Treese et. al. in *Proc. of the USENIX Summer 1993 Technical Conference*, Jun. 21-25, 1993, pp. 87-99.

Article entitled "Firewalls for Sale" by Bryan, in *BYTE*, Apr. 1995, pp. 99-104.

Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.

Article entitled "Safe Use of X Window System Protocol Across a Firewall" by Kahn, in *Proc. of the Fifth USENIX UNIX Security Symposium*, Jun. 5-7, 1995, pp. 105-116.

Article entitled "Automating the OSI to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.

Article entitled "A Secure Email Gateway (Building an RCAS External Interface)" by Smith, in *Tenth Annual Computer Security Applications Conference*, Dec. 5-9, 1994, pp. 202-211.

Article entitled "Secure External References in Multimedia Email Messages" by Wiegel, in *3rd ACM Conference on Computer and Communications Security*, Mar. 14-16, 1996, pp. 11-18.

Memo entitled "SOCKS Protocol Version 5" by Leech et. al., in *Standards Track*, Mar. 1996, pp. 1-9.

Article entitled "Securing the Web: firewalls, proxy servers, and data driver attacks" by Farrow in *InfoWorld*, Jun. 19, 1995, vol. 17, No. 25, p. 103.

Website: Go Secure! for Microsoft Exchange—Products/Services—Verisign, Inc. www.verisign.com.

Article entitled "MIMEsweeper defuses virus network, net mail bombs" by Avery, in *Info World*, May 20, 1996, vol. 12, No. 21, p. N1.

Article entitled "Stomping out mail viruses" by Wilkerson, in *PC Week*, Jul. 15, 1996, p. N8.

PCT Application PCT/US/2008/082596, International Search Report and Written Opinion, mailed May 25, 2009, 10 pages.

Article entitled "An Example-Based Mapping Method for Text Categorization and Retrieval" by Yang et. al., in *ACM Transactions on Information Systems*, Jul. 1994, vol. 12, No. 3, pp. 252-277.

Article entitled "A Comparison of Two Learning Algorithms for Text Categorization" by Lewis et al., in Third Annual Symposium on *Document Analysis and Information Retrieval*, Apr. 11-13, 1994, pp. 81-92.

Article entitled "Learning Limited Dependence Bayesian Classifiers" by Sahami, in *Proceedings of the Second International Conference on Knowledge Discovery and Data Mining,* 1996, pp. 335-338.

Article entitled "An Evaluation of Phrasal and Clustered Representations on a Text Categorization Task" by Lewis, in *15th Ann Int'l SIGIR,* Jun. 1992, pp. 37-50.

Book entitled *Machine Learning* by Mitchell, 1997, pp. 180-184.

Article entitled "Learning Rules that Classify E-mail" by Cohen, pp. 1-8. Date unknown.

Article entitled "Hierarchically classifying documents using very few words" by Koller et. al., in *Proceedings of the Fourteenth International Conference on Machine Learning,* 1997.

Article entitled "Classification of Text Documents" by Li et. al., in *The Computer Journal,* vol. 41, No. 8, 1998, pp. 537-546.

Article entitled "Issues when designing filters in messaging systems" by Palme et. al., in 19 *Computer Communications,* 1996, pp. 95-101.

Article entitled "Text Categorization with Support Vector Machines: Learning with Many Relevant Features" by Joachins in *Machine Learning: ECML-98,* Apr. 1998, pp. 1-14.

Article entitled "Hierarchical Bayesian Clustering for Automatic Text Classification" by Iwayama et al. in *Natural Language,* pp. 1322-1327. Date unknown.

Article entitled "Smokey: Automatic Recognition of Hostile Messages" by Spertus in *Innovative Applications* 1997, pp. 1058-1065.

Article entitled "A Comparison of Classifiers and Document Representations for the Routing Problem" by Schutze. Date unknown.

Article entitled "CAFE: A Conceptual Model for Managing Information in Electronic Mail" by Takkinen et al. in *Proc. 31st Annual Hawaii International Conference on System Sciences,* 1998, pp. 44-53.

Article entitled "A Comparative Study on Feature Selection in Text Categorization" by Yang et. al. Date unknown.

Article entitled "Spam!" by Cranor et. al. in *Communications of the ACM,* vol. 41, No. 8, Aug. 1998, pp. 74-83.

Article entitled "Sendmail and Spam" by LeFebvre in *Performance Computing,* Aug. 1998, pp. 55-58.

Article entitled "Implementing a Generalized Tool for Network Monitoring" by Ranum et. al. in *Lisa XI,* Oct. 26-31, 1997, pp. 1-8.

Article entitled "Method for Automatic Contextual Transposition Upon Receipt of Item of Specified Criteria" printed Feb. 1994 in *IBM Technical Disclosure Bulletin,* vol. 37, No. 2B, p. 333.

Article entitled "Toward Optimal Feature Selection" by Koller et al., in *Machine Learning: Proc. of the Thirteenth International Conference,* 1996.

Website: Technical Focus—Products—Entegrity AssureAccess. www2.entegrity.com, 2012.

Website: Create Secure Internet Communication Channels—Atabok Homepage. www.atabok.com, 2012.

Website: Atabok VCNMAIL™ Secure Email Solution—Atabok Related Produces. www.atabok.com, 2012.

Website: Atabok VCN Auto-Exchange™—Atabok Related Produces. www.atabok.com, 2012.

Website: Controlling Digital Assets is a Paramount Need for All Business—Atabok Related Produces. www.atabok.com, 2012.

Website: Control Your Confidential Communications with Atabok—Atabok Related Produces. www.atabok.com, 2012.

Website: Entrust Entelligence—Entrust Homepage. www.entrust.com, 2012.

Website: E-mail Plug-in—Get Technical/Interoperability—Entrust Entelligence. www.entrust.com, 2012.

Website: E-mail Plug-in—Get Technical/System Requirements—Entrust Entelligence. www.entrust.com, 2012.

Website: E-mail Plug-in—Features and Benefits—Entrust Entelligence. www.entrust.com, 2012.

Website: Internet Filtering Software—Internet Manager Homepage. www.elronsw.com, 2012.

Website: ESKE—Email with Secure Key Exchange—ESKE. www.danu.ie, 2012.

Website: Terminet—ESKE. www.danu.ie, 2012.

Website: Baltimore Focus on e-Security—Baltimore Technologies. www.baltimore.com, 2012.

* cited by examiner

ADJUSTING FILTER OR CLASSIFICATION CONTROL SETTINGS

TECHNICAL FIELD

This document relates generally to systems and methods for processing communications and more particularly to systems and methods for classifying and/or filtering communications.

BACKGROUND

Internet connectivity has become central to many daily activities. For example, millions of people in the United States use the internet for various bill pay and banking functionalities. Countless more people use the internet for shopping, entertainment, to obtain news, and for myriad other purposes. Moreover, many businesses relies on the internet for communicating with suppliers and customers, as well as providing a resource library for their employees. However, various entities still use the internet for malicious or non-reputable activity. For example, spammers send billions of messages daily causing headaches for many users and administrators.

Reputation systems and message profilers have enabled better recognition of non-reputable traffic. Reputation systems and message profilers can take a one size fits all approach to identifying non-reputable entities and/or messages. Such an approach can lead to users opting out of such protection and ignoring the information provided by such systems.

SUMMARY

In one aspect, systems, methods, apparatuses and computer program products are provided. In one aspect, methods are disclosed, which comprise: receiving a plurality of ranges from an administrator; providing a security control interface to a user, the security control interface comprising a plurality of security control representations associated with security controls, each of the security control mechanisms including an associated range from among the plurality of ranges, the associated range defining a minimum and maximum setting associated with the respective security controls; receiving a plurality of security control settings from the user through the security control interface; adjusting a plurality of thresholds related to plurality of control settings received from the user, the plurality of thresholds being associated with tolerance for a classification of potential security violation; and, filtering communications streams from a protected entity associated with the user based upon the plurality of thresholds.

Systems can include a security control interface, a policy control interface and a filtering module. The security control interface can produce security control representations, each of the security control representations being operable to control security settings associated with a protected entity. The policy control interface can produce policy control representations, each of the policy control representations being operable to control policy settings associated with a protected entity. The filtering module can filter one or more communication streams based upon the plurality of security settings and based upon the plurality of policy settings.

Computer readable media can include program code operable to enable adjustment of filter and/or classification settings for incoming and outgoing communications, causing a processor to performs steps including: receiving a plurality of ranges from an administrator; providing a security control interface to a user, the security control interface comprising a plurality of security control representations associated with a plurality of security control settings, each of the security control mechanisms including an associated range from among the plurality of ranges, the associated range defining a minimum and maximum setting associated with the respective security controls; receiving input from the user through the security control interface, the input requesting adjustment of the security control settings; adjusting a plurality of thresholds related to plurality of control settings received from the user, the plurality of thresholds being associated with tolerance for a classification of potential security violation; and, filtering communications streams from a protected entity associated with the user based upon the plurality of thresholds.

DETAILED DESCRIPTION

Figure 1A:
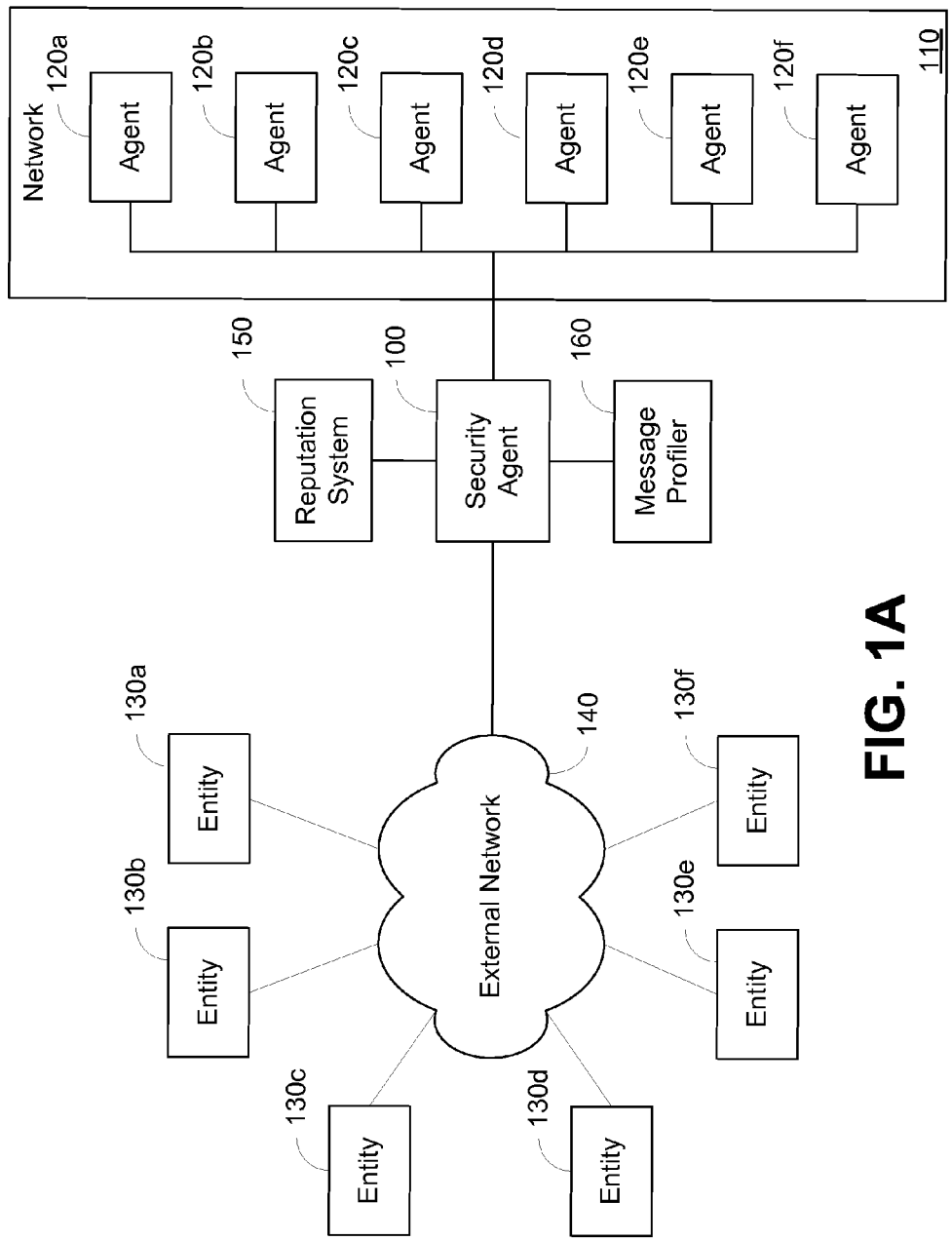
FIG. 1A is a block diagram of an example network environment including a security agent.

FIG. 1 is a block diagram depicting an example network environment including a security agent. In various implementations, the network environment can include a security agent 100, a protected network 110 including a number of agents 120a-f, and a plurality of external entities 130a-f connected via an external network 140. The security system, in various implementations, can include a reputation system 150 and/or a message profiler 160. In some implementations, the security agent 100 can reside between a firewall system (not shown) and a network 110 (e.g., an enterprise network). The network 110, in various implementations, can include a plurality of agents (e.g., computers). In further implementations, the network 110 can include a number of servers, including, for example, electronic mail servers, web servers, and various application servers as may be used by the enterprise associated with the network 110.

In various implementations, the security agent 100 can monitor communications entering and exiting the network 110. These communications can be received, for example, through an external network 120 (e.g., the Internet) from any of a number of entities 130a-f connected to the external network 120. One or more of the entities 130a-f can be legitimate originators of communications traffic while other(s) of the entities 130a-f can also be non-reputable reputable entities originating unwanted communications. However, it can be difficult to know in advance which of the entities 130a-f are originating unwanted communications and which are originating legitimate communications. As such, in some implementations, the security agent 100 can include a reputation engine 150.

In various implementations, the reputation engine can inspect a communication and to determine a reputation of an entity 130a-f associated with the communication. In some implementations, the security agent 100 can determine what action to take with the communication based upon the reputation of the originating entity. For example, if the reputation indicates that the originator of the communication is reputable the security agent can forward the communication to the recipient of the communication. However, if the reputation indicates that the originator of the communication is non-reputable, for example, the security agent can quarantine the communication, perform more tests on the message, or require authentication from the message originator, among many others. Reputation engines are described in detail in United States Patent Publication No. 2006/0015942, which is hereby incorporated by reference.

In further implementations, the security agent 100 can monitor incoming communications and derive the reputable and non-reputable characteristics of a communication by identifying the characteristics associated with the communication. For example, the attributes associated with communications can be compared to the attributes of known reputable and known non-reputable messages to determine whether the communication is legitimate or not. Message profiling is describe in detail in U.S. application Ser. No. 11/173,941, entitled "Message Profiling Systems and Methods," filed on Jun. 2, 2005.

In some implementations, a tolerance for specific types of messages or activity can be set by a user via an agent 120a-f or an administrator of the security agent 100. However, it can be impractical for a user to set tolerances for each individual attribute. Thus, in some implementations, the user can provide control settings through an agent 120a-f for general classifications of activities. For example, a user associated with one of agents 120a-f might have a high tolerance for spam messages, and a low tolerance for virus activity. Thus, the security agent 100 can be set to include a low threshold for attributes or senders that might be originating virus content, while also being set to include a high threshold for attributes or senders that might be originating spam content.

In some implementations, a low threshold for classifying a communication can lead to overinclusive classification of a category, while a high threshold for classifying a communication can lead to an underinclusive classification of a category. For example, when a threshold is set low, a communication does not need to exhibit many of the attributes associated with a classification before being assigned to the classification. Likewise, when the threshold is set high, a communication would exhibit many of the attributes associated with a classification before being assigned to the classification. In some implementations, when the threshold is set high, positive attributes associated with the communication can be overweighted in the analysis. In other implementations, when the threshold is set low, positive attributes associated with the communication can be underweighted in the analysis.

Figure 1B:
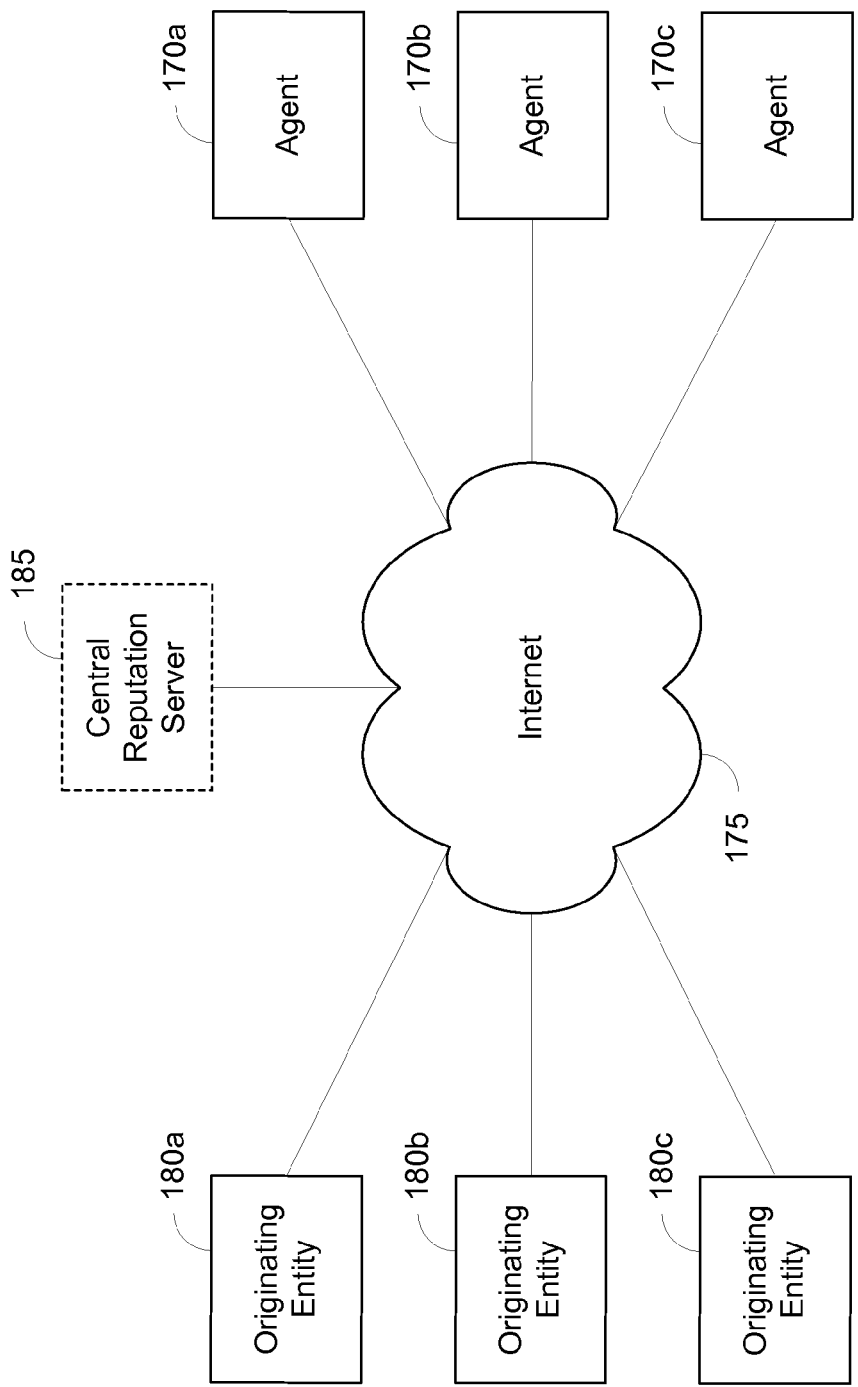
FIG. 1B is a block diagram of another example network architecture including local security agents.
Figure 2:
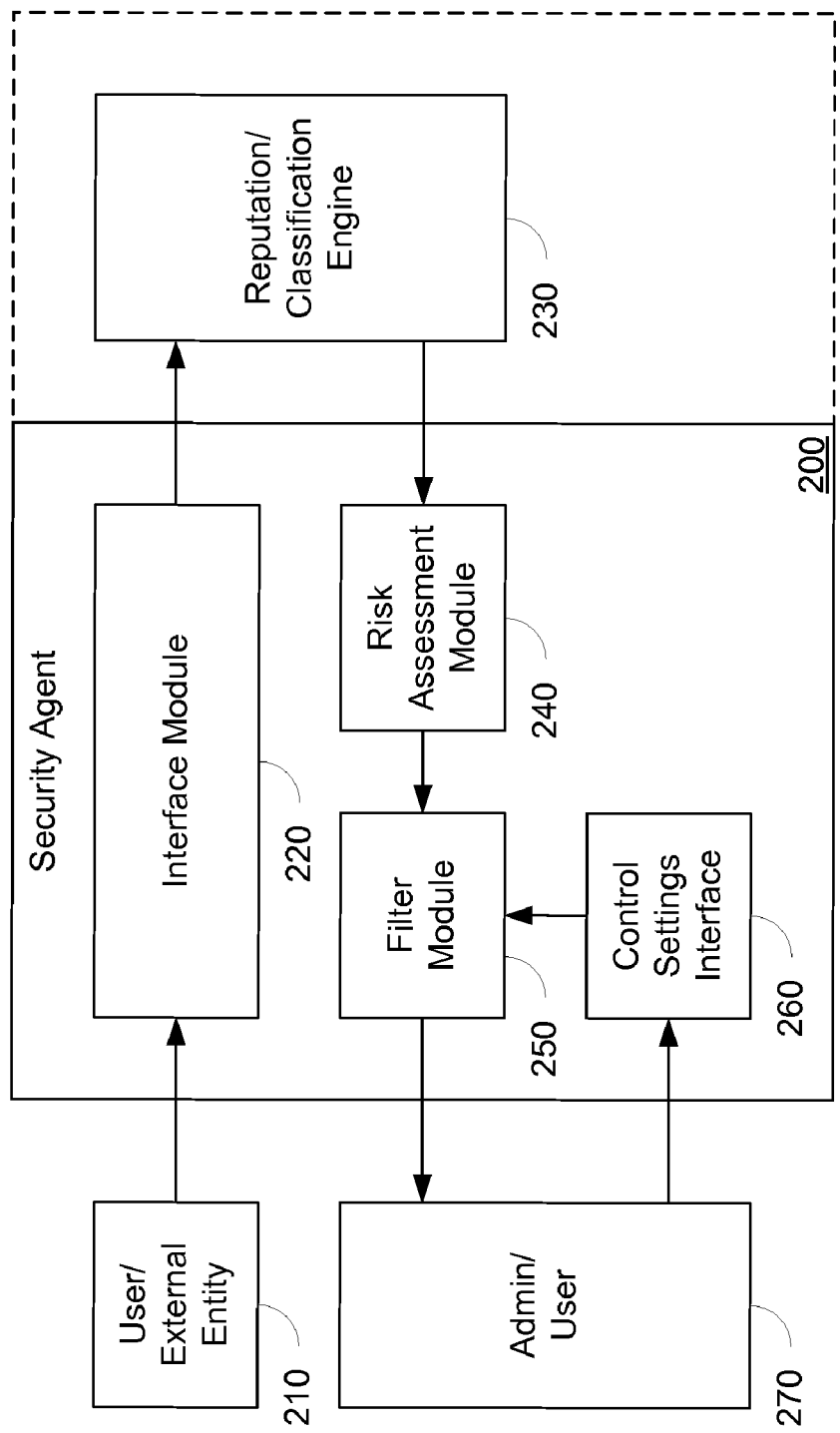
FIG. 2 is a block diagram of an example security agent.

FIG. 1B is a block diagram illustrating an example network architecture including local security agents. In the example of FIG. 2, a number of agents 170a-c can be coupled to an external network 175. In some implementations, the agents 170a-c can reside on personal computing devices (e.g., personal computer, mobile communications device, laptop computer, personal digital assistant, etc). The agents 170a-c can include a local reputation engine and/or a message profiler.

A number of other entities 180a-c can also be coupled to the network 175. The entities 180a-c can send communications on the network. Some of the communications originating from the entities 180a-c can be directed to personal computing devices that include agents 170a-c. The agents 170a-c can receive the communications and determine what action to take with the communication based upon the reputation of the sending entity 180a-c or a profile (e.g., attributes) associated with the communication. For example, if the receiving agent 170a-c determines that the message is not legitimate, or that the sending entity 180a-c is not legitimate, the agent 170a-c can determine to delay delivery of the communication, place the communication in a quarantine, mark the communication, or drop the communication, among others. In other examples, where the message is legitimate, the agent 170a-c can allow a program associated with the communication to access the communication.

In some implementations, the agents 170a-c can include a user interface. The user interface can allow users associated with the agents 170a-c to adjust control setting associated with the agents 170a-c. For example, if the user has a particular aversion to bulk communications (e.g., spam messages), the user can set the control settings to classify communications as bulk even where the communication only shares a few characteristics with known bulk communications. Similarly, if the user is not concerned about bulk messages, and is instead more concerned with misclassification of communications, the user can set the control settings to provide a stricter classification of bulk communications, thereby identifying fewer communications as bulk communications. In another example, the user and/or administrator might have a particular aversion to phishing websites. In such instances, the user can In some implementations, the user might not care about the type of content that is being delivered but rather a communications risk associated with that content. In such implementations, the user can set the control settings to provide a higher tolerance for various content classifications associated with incoming data (e.g., including e-mail, web-data, instant messaging data, voice over internet protocol (VoIP) data, or any other application used to communicate data) presented and provide a lower tolerance for classification of communications risk associated with any incoming data.

In some implementations, an optional central reputation server 185 can be included. The central reputation server 185 can provide reputation information regarding the network entities 180a-c to the agents 170a-c upon request. For example, one of the agents 170a-c might receive a communication from an entity 185a-c from which it has previously not received communications. As such, the agent 170a-c might not be configured to determine a reputation associated with the entity 180a-c. However, the agent 170a-c can send a reputation request to a central reputation server 185 to determine a reputation associated with the entity 180a-c.

In further implementations, the agents 170a-c can outsource all reputation functions to the central reputation server 185. Thus, each communication received by the agents 170a-c can be queried to the central reputation server 185. In further implementations, the agents 170a-c can provide control settings to the central reputation server 185. In such implementations, the central reputation server can use the control settings received from the agents 170a-c to bias the respective query responses sent to each of the agents 170a-c.

In some implementations, the central reputation server can be a reputation server associated with a large network receiving and/or routing a large volume of traffic daily. The central reputation server in such instances could provide a reputation based upon the communications and behavior that the central reputation server has directly observed. In further implementations, the central reputation server 185 could be one of many central reputation servers configured to provide reputation information to agents 170*a-c*.

In other implementations, the central reputation server can provide an aggregation of multiple local reputations, such as the local reputations derived by agents 170*a-c*. For example, the central reputation server might periodically poll a plurality of agents 170*a-c* for reputation information associated with all the traffic the agents 170*a-c* have observed. The reputation server 185 can then aggregate the local reputation information to provide a global reputation.

FIG. 2 is a block diagram of an example security agent 200. In various implementations, the security agent 200 can receive data from a user or an external entity 210 (e.g., depending on the direction of the data flow) at an interface module 220. The communications can be received through any of a variety of communications media (e.g., wired or wireless).

In some implementations, the interface module can provide the communications to a reputation and/or classification engine 230. The reputation and/or classification module 230 can operate to provide reputation of entities associated with data and/or classification of data received. In some implementations, the reputation and/or classification module 230 can be a part of the security agent 200. In other implementations, the reputation and/or classification module 230 can be provided to the security agent 200 from a central device.

In various implementations, reputation can be derived based upon one or more entities associated with various types of data. The past activities of such entities can be used to predict the future activities of these entities. For example, if an entity originates spam with a high frequency, there is some likelihood that future communications include spam. In some implementations, as the frequency with which entities engage in an activity rises, the likelihood that the future activity exhibits the same characteristic also rises. In further implementations, the reputation can also be time dependent. For example, an entity might have malware (e.g., a "bot") installed on the device. Such malware can periodically send data to other devices at predetermined times. Such entities can be assigned reputations that include time dependencies. In those implementations including a reputation engine, such characteristics can be identified by the reputation and/or classification module 230 and provided to the security agent 200 for use in determining whether to allow the associated data.

In some implementations, classification of data can be derived based upon the similarities between data content and previously classified content. For example, a user/administrator can identify a corpus of documents associated with a particular classification. The corpus of documents have been identified by the user/administrator as exhibiting the characteristics belonging to the particular classification identified. A classification engine can analyze the corpus of documents to identify similarities between the documents, thereby identifying the defining characteristics of the particular classification of documents. Subsequently received data can then be tested to determine whether the data exhibits the same features as the corpus of documents characteristic of the particular classification. In various implementations, multiple classifications of documents can be identified by providing multiple sets of document corpora. For example, a user/administrator might provide a document corpus for a spam classification, a document corpus for a phishing classification, a document corpus for a malware classification, or a document corpus for a spyware classification, among many others. In those implementations including a classification engine, such classification characteristics can be identified by the reputation and/or classification module 230 and provided to the security agent 200 for use in determining whether to allow the associated data.

In some implementations, the security agent 200 can include an risk assessment module 240. The risk assessment module 240 can operate to assess a risk associated with the particular activity 240 being engaged in by the user. In various implementations, risks can include a spectrum of activities. The closer an activity lies to an origin of a risk scale associated with the activity, the safer the activity is. The further away an activity is from the origin of the risk scale associated with the activity, the more risk involved in the activity. In various examples, risk classifications can include: liability, maturity, network security, bandwidth exhaustion, communication freedom, information security, and low productivity. Other risk classifications can be used. The risk assessment module 240 can assess the activity to identify the risk associated with the activity.

In various implementations, the security agent 200 can include a filter module 250. The filter module 250 can receive an assessed risk associated with an activity from the risk assessment module 240. The filter module 250 can apply a policy to determine whether the activity falls within an acceptable risk level. In those instances where the activity is outside of an acceptable risk level, the activity can be blocked and an administrator and/or user 260 can be notified. In those instances where the activity is within an acceptable risk level, the activity can be allowed and the user 260 can be allowed to continue the activity.

In various implementations, the security agent can also include a control settings interface 270. The control settings interface 270 can facilitate the provision of policy by a user and/or administrator 260. The control settings interface 270 can allow the user and/or administrator to tune his/her own comfort levels with respect to risk associated with activities engaged in by the user(s). For example, the classification of data and reputation of the entity originating the data can be conflated using multiple transform into several risk classifications. An assessment of the risk associated with the data in these different categories can then be made by comparing the risk associated with the activity to a policy to determine whether the activity is prohibited by policy.

Figure 3A:
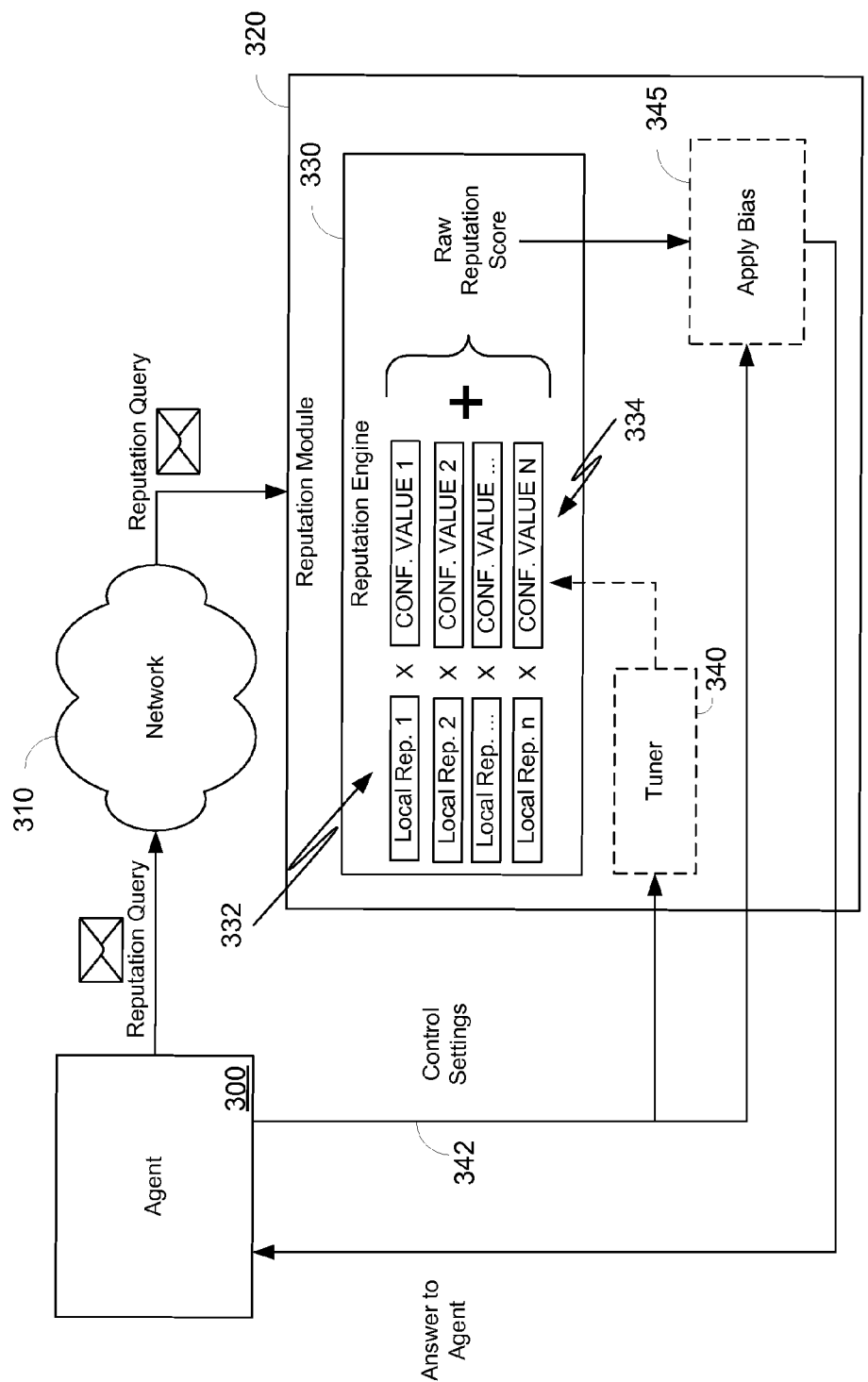
FIG. 3 is a block diagram of a system used to derive global reputation.

FIG. 3A is a block diagram of a central reputation module. In some implementations, control settings can be used to adjust the determination of a global reputation by the central reputation module based on local reputation feedback. A security agent 300 can send a query through a network 310 to a reputation module 320. In some implementations, the reputation module 320 can be local to the security agent 300. In some examples, the security agent 300 originates a query in response to receiving a communication from an unknown entity. Alternatively, the security agent 300 can originate the query responsive to receiving any communications, thereby promoting use of more up-to-date reputation information.

The reputation module 320 is operable to respond to the query with a global reputation determination. The central reputation module 320 can derive the reputation using a reputation engine 330. In some implementations, the reputation engine 330 is operable to receive a plurality of local reputations 332 from a respective plurality of local reputation engines. In some examples, the plurality of local reputations 332 can be periodically sent by the reputation engines to the reputation module 320. Alternatively, the plurality of local reputations 332 can be retrieved by the server upon receiving a query from a security agent 300. In some implementations, the reputation module 330 can be a central reputation module and the plurality of local reputations 332 can include a local reputation derived by a local reputation engine associated with the security agent 300.

The local reputations can be combined using confidence values 334 related to each of the local reputation engines and then accumulating the results. The confidence value 334 can indicate the confidence associated with a local reputation produced by an associated reputation engine. Reputation engines associated with individuals, for example, can receive a lower weighting in the global reputation determination. In contrast, local reputations associated with reputation engines operating on large networks can receive greater weight in the reputation determination based upon the confidence value 334 associated with that reputation engine.

In some implementations, the confidence values 334 can be based upon feedback received from users. For example, a reputation engine that receives a lot of feedback indicating that communications were not properly handled because local reputation information 332 associated with the communication indicated the wrong action can be assigned low confidence values 334 for local reputations 332 associated with those reputation engines. Similarly, reputation engines that receive feedback indicating that the communications were handled correctly based upon local reputation information 332 associated with the communication indicated the correct action can be assigned a high confidence value 334 for local reputations 332 associated with the reputation engine.

In some implementations, a tuner 340 can be used to adjust the confidence values associated with the various reputation engines. The tuner can to receive control settings 342 and can adjust the confidence values based upon the received control settings 342. For example, the agent 300 can provide control settings 342 including a variety of security settings, such as any of virus sensitivity settings, computer worm sensitivity settings, phishing detection sensitivity settings, trojan horse sensitivity settings, among many other types of malware sensitivities and combinations thereof.

In other examples, the agent 300 can provide control settings that include a variety of policy settings, such as spyware sensitivity settings, spam sensitivity settings, bulk mail sensitivity settings, content sensitivity settings, user privacy sensitivity settings, and many other policy settings to protect the network from unwanted or illegal activity, including, in some instances, communications traffic originating from the protected computer (e.g., preventing spyware infecting a computer from providing keystroke logs to external entities). In some implementations, various settings might be classified as security settings, while other settings might be reclassified as policy settings. For example, spam settings can be classified under security settings and/or policy settings depending on a configuration desired by an administrator or user. In other examples, phishing settings can be classified as a security setting or as a policy setting based upon the configuration provided by an administrator or a user.

In various implementations, the confidence values 334 can be provided to the reputation module 320 by the local reputation engine itself based upon stored statistics for incorrectly classified entities. In other implementations, information used to weight the local reputation information can be communicated to the reputation module 320.

In some examples, a bias 345 can be applied to the resulting global reputation vector. The bias 345 can normalize the reputation vector to provide a normalized global reputation vector to a security agent 300. Alternatively, the bias 345 can be applied to account for local preferences associated with the security agent 300 originating the reputation query. Thus, a security agent 300 can receive a global reputation vector matching the defined preferences of the querying security agent 300. The security agent 300 can take an action on the communication based upon the global reputation vector received from the reputation module 320.

In some implementations, the preferences used in the bias 345 can include control settings 342 provided by the security agent 300 to the central reputation module 320. For example, the agent 300 can provide control settings 342 including a variety of security settings and/or policy settings. In some implementations, security settings can include policy settings. In industry, policy settings are often set up as security measures to prevent misuse of company equipment and to secure sensitive trade secrets from exposure.

Figure 3B:
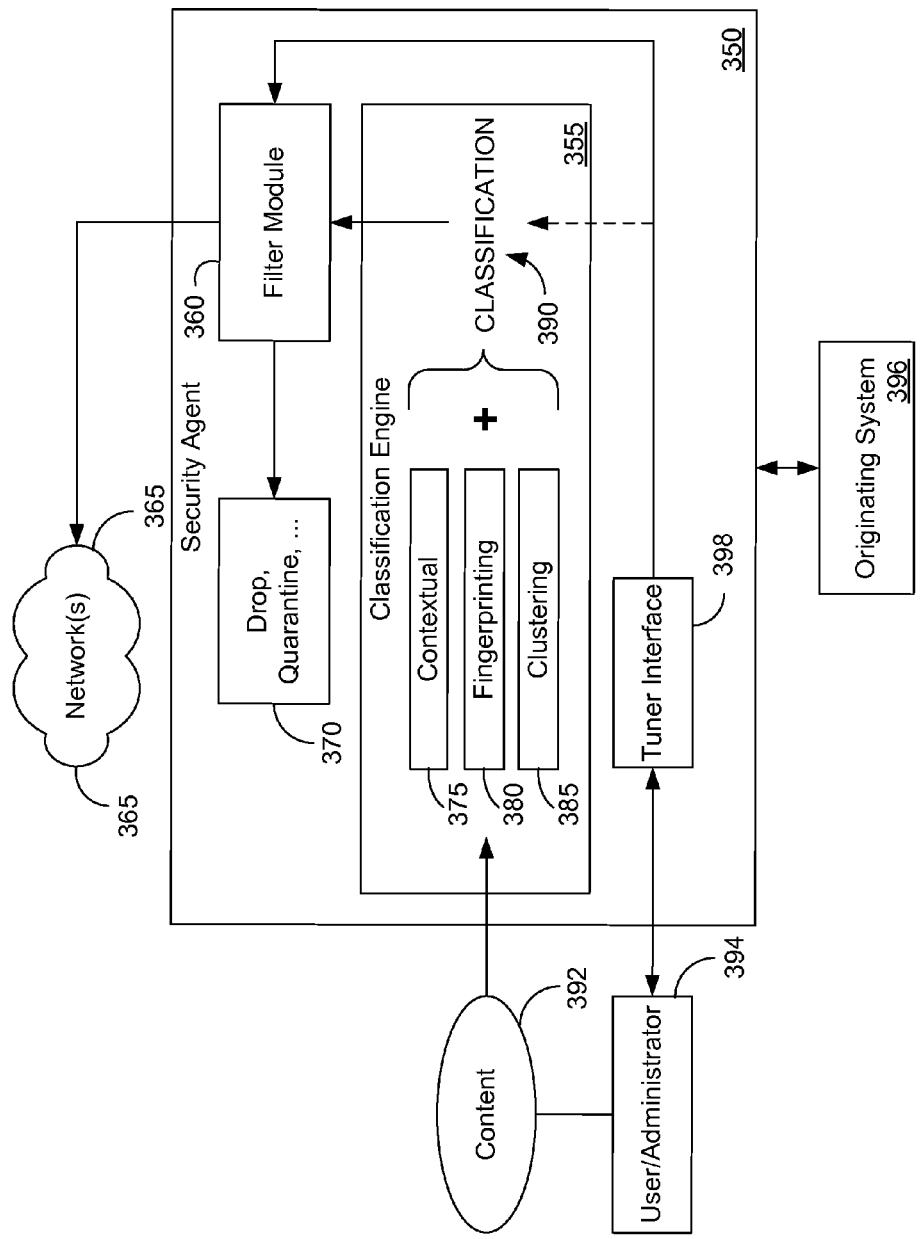

FIG. 3B is a block diagram of an example security agent 350. In some implementations, control settings can be used to adjust the classification and/or filtering of messages by a the security agent 350. In various implementations, the security agent can be configured to examine an existing set of related files 392, as specified by an administrator 394, to create identification characteristics associated with the set of related files 392. The files 392 can be supplied to a classification engine 355. In various implementations, the classification engine 355 might use any of the classification techniques 375, 380, 385 on the set of related files 392 to determine the features or characterizations identifying relationships between the files 392. For example, legal documents might include Latin phrases such as in re, ipso facto, or prima facie. Such an inclusion could be discoverable by a message classification engine 355.

In some implementations, a classification engine 355 can generate a set of identifying characteristics for a class of content. The same techniques 375, 380, 385 are then used on communications entering the security agent 350. In these implementations, the characteristics of the communication may then be compared to the identifying characteristics for a class of content to determine in which class (if any) the content of the communication belongs, thereby producing a content classification 390 for the communication. In some implementations, the security agent 350 can apply a policy related to the content classification, as shown by the filtering module 360, to determine whether the communication will be delivered via network 365, or dropped, quarantined, etc. as shown by block 370. In the event that a communication does not satisfy policy, the originating system 396 can be alerted to the policy failure. The messaging content compliance system could also notify a system user or administrator 394 and/or sender of the policy failure.

In some implementations, the security agent 350 can provide an tuner interface 398 to a user or an administrator 394. The tuner interface can be used by the user or administrator to make adjustments to the classification engine 355. In some implementations, the user or administrator 394 can provide control settings to the classification engine 355. The control settings can adjust the level of similarity found between received messages and classification characterizations before classifying the received message as belonging to a classification. In other implementations, the control settings can adjust the range into which a message characteristics may fall before being classified as belonging to a classification. In some implementations, the provision of control settings can dynamically adjust the level of filtering associated with the security agent. In other implementations, the provision of control settings can adjust the level of system resources consumed by the security agent.

In still further implementations, the tuner interface 398 can provide an interface that facilitates adjustment of the filter module 360 based upon the type of traffic. For example, the administrator/user might determine that electronic mail should be monitored more closely than other types of data communications (e.g., web traffic, music/video streaming traffic, instant messaging traffic, etc.). In such examples, the administrator can use the interface to adjust the control settings based upon the type of traffic being filtered.

In other implementations, the tuner interface 398 can provide an interface to facilitate adjustment of risk tolerance associated with communications. In such implementations, an administrator and/or user can provide control settings to the filter indicating one or more classifications of traffic that the filter should pass based upon the risk associated with the communications. Thus, while data might be loosely or strictly classified by the classification engine 355 the filter module 360 can be adjusted by the tuner interface to provide strict enforcement of filter policies or loose enforcement of filter policies based upon the risk associated with data of the various classifications.

Figure 4:
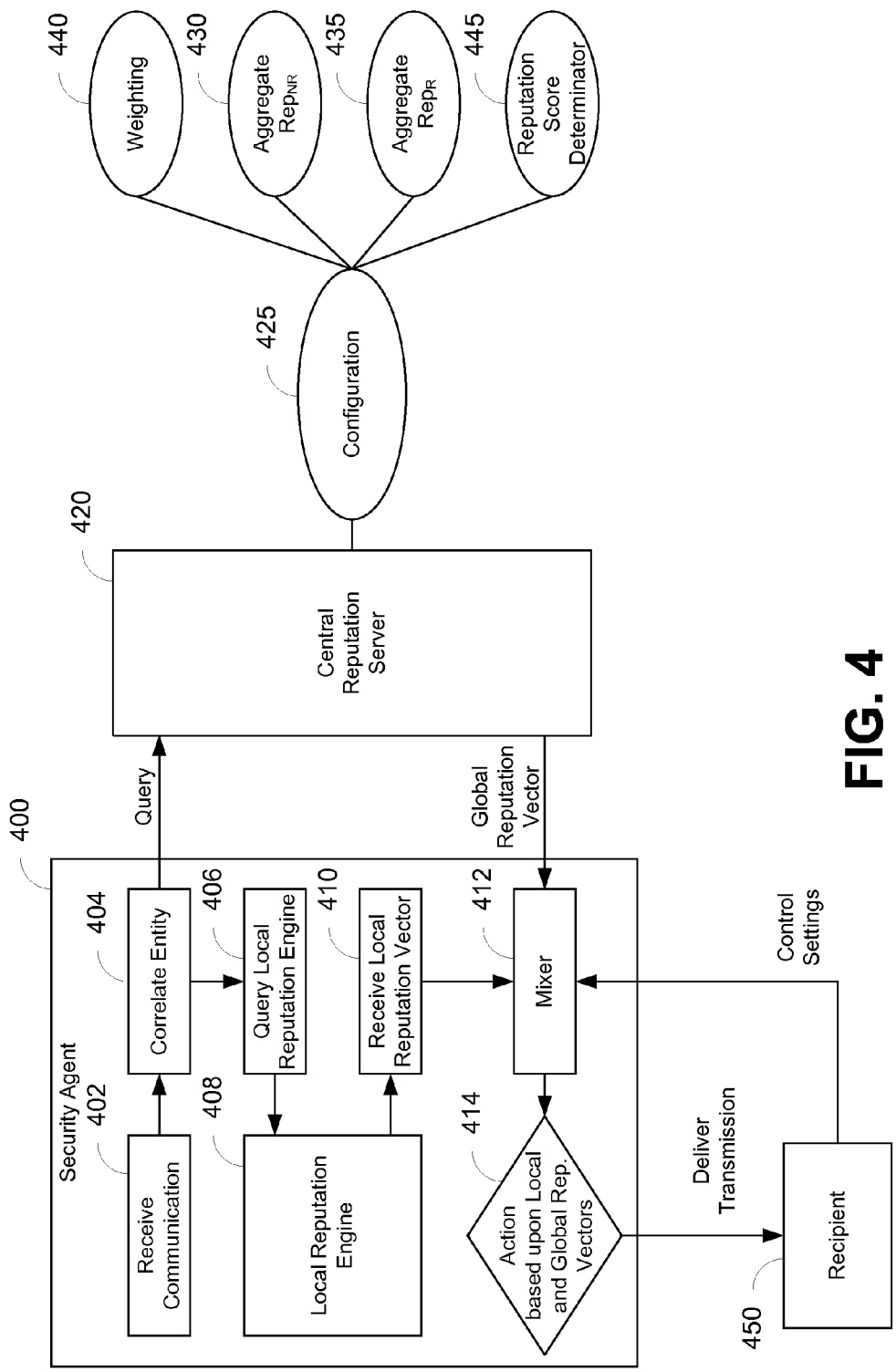
FIG. 4 is a block diagram of a system providing resolution between a global reputation and a local reputation.

FIG. 4 is a block diagram illustrating an example resolution between a global reputation and a local reputation. In some implementations, a security agent (e.g., security agent 300 of FIG. 3A) can use global reputation data and provide resolution between global reputation data and local reputation data. The security agent 400 communicates with a server 420 to retrieve global reputation information from the server 420. The local security agent 400 can receive a communication at 402. The local security agent can correlate the communication to identify attributes of the message at 404. The attributes of the message can include, for example, an originating entity, a fingerprint of the message content, a message size, etc. The local security agent 400 includes this information in a query to the server 420. In other examples, the local security agent 400 can forward the entire message to the server 420, and the server can perform the correlation and analysis of the message.

The server 420 uses the information received from the query to determine a global reputation based upon a configuration 425 of the server 420. The configuration 425 can include a plurality of reputation information, including both information indicating that a queried entity is non-reputable 430 and information indicating that a queried entity is reputable 435. The configuration 425 can also apply a weighting 440 to each of the aggregated reputations 430, 435. A reputation score determinator 445 can provide the engine for weighting 440 the aggregated reputation information 430, 435 and producing a global reputation vector.

The local security agent 400 then sends a query to a local reputation engine at 406. The local reputation engine 408 performs a determination of the local reputation and returns a local reputation vector at 410. The local security agent 400 also receives a response to the reputation query sent to the server 420 in the form of a global reputation vector. The local security agent 400 then mixes the local and global reputation vectors together at 412. An action is then taken with respect to the received message at 414.

Figure 5:
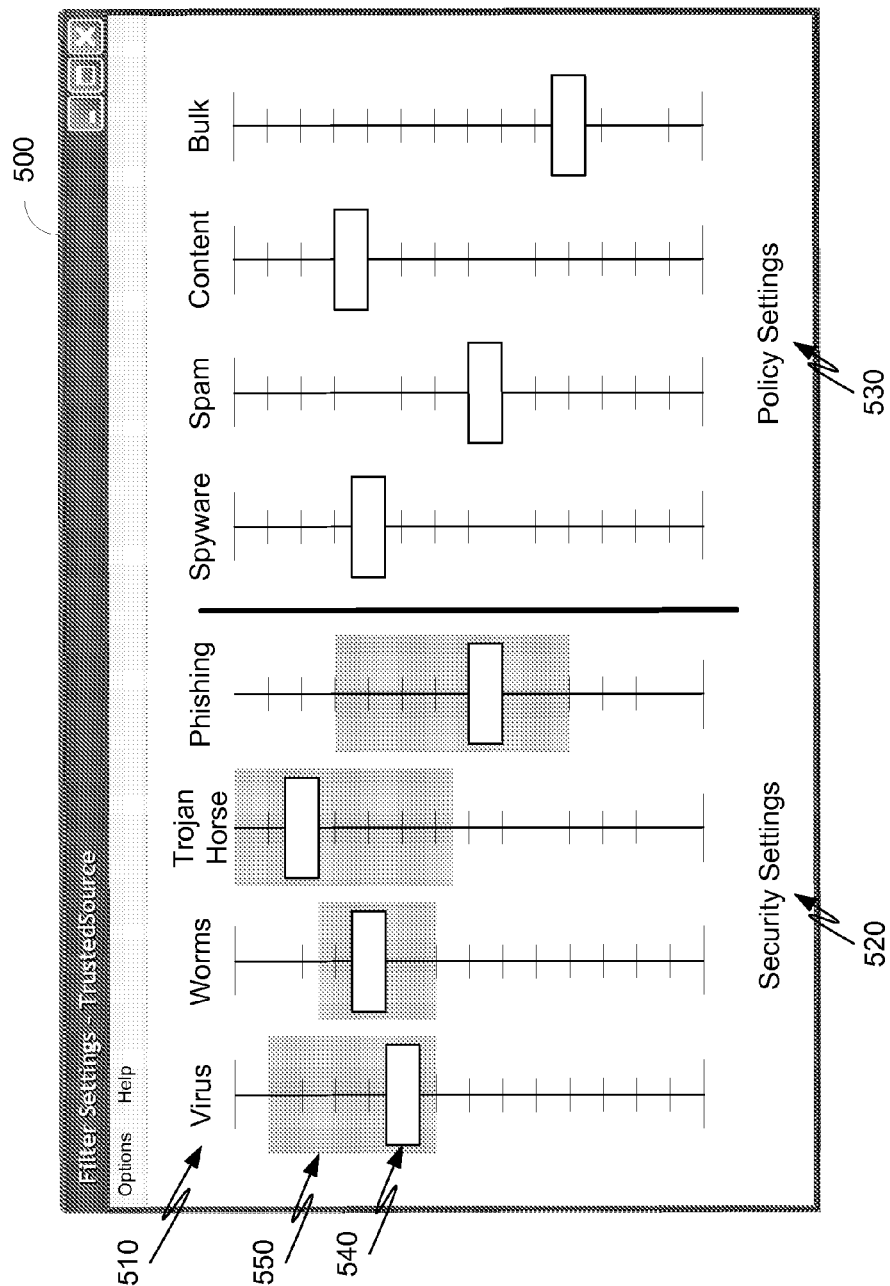
FIG. 5 is a screen shot of an example graphical user interface used to adjust the settings of a communications filter.

In some implementations, the mixer 412 can include security and/or policy control settings received from the recipient 450. For example, a recipient 450 associated with an adult content provider might not be interested in blocking communications including adult content from the computer. Thus, the recipient 450 might raise a threshold associated with classifying a particular communication as non-reputable based upon adult content included in the communication. In various implementations, multiple security and/or policy control settings can be provided. For example, such settings can include, malware detection settings, virus detection settings, phishing detection settings, trojan horse detection settings, logic bomb detection settings, zombie detection settings, spyware detections settings, click fraud detection settings, distributed denial of service detection settings, spam detection settings, bulk communications detection settings, policy violation detection settings, among many others, and combinations thereof FIG. 5 is an example graphical user interface 500 for adjusting the settings of a filter associated with a reputation server. The graphical user interface 500 can allow the user of a local security agent to adjust the settings of a local filter in several different categories 510, such as, for example, "Virus," "Worms," "Trojan Horse," "Phishing," "Spyware," "Spam," "Content," and "Bulk." However, the categories 510 depicted are merely examples. Other categories are possible.

In various implementations, this disclosure provides an interface that enables users and/or administrators to dynamically control filtering of inbound and outbound network traffic. For example, a user and/or administrator can adjust the filtering to lower spam filtering but adjust the filtering to raise porn filtering. In additional implementations, the user and/or administrator can "tune" the amount of inbound and outbound filtering. For example, a network administrator can be responsible for the performance of the network as well as the identification of unwanted network traffic. Thus, the network administrator might want to increase throughput of a filtering system to boost network performance, while sacrificing the identification of some types of traffic.

In some implementations, the categories 510 can be divided into two or more types of categories. For example, the categories 510 of FIG. 5 are divided into a "Security Settings" type 520 of category 510, and a "Policy Settings" type 530 of category. Other categories are possible. In each of the categories 510 and types 520, 530, a mixer bar representation 540 can allow the user to adjust the particular filter setting associated with the respective category 510 of communications or entity reputations.

Moreover, while categories 510 of "Policy Settings" type 530 in various implementations can be adjusted freely based upon the user's own judgment, categories of "Security Settings" type 520 can be limited to adjustment within a range. This limitations on adjustment can be set in order to prevent a user from altering the security settings of the security agent beyond a range acceptable to a network administrator. For example, a disgruntled employee could attempt to lower the security settings, thereby leaving an enterprise network vulnerable to attack. Thus, in some implementations, the range limitations 550 placed on categories 510 in the "Security Settings" type 520 are operable to keep security at a minimum level to prevent the network from being compromised. In some implementations, the ranges 550 can be hard-wired by the system. In other implementations, the ranges 550 can be adjusted by the administrator or based upon a profile selected by a user and/or administrator. Such ranges 550 can prevent users from subverting network settings.

In various examples, the "Policy Settings" type 530 categories 510 are those types of categories 510 that would not compromise the security of a network, but might only inconvenience the user or the enterprise if the settings were lowered. Thus, in some implementations the "Policy Settings" 530 can be adjusted freely. In other implementations, the "Policy Settings" 530 can include limitations set by the administrator, by a profile, or hard-wired by the system.

Furthermore, in some implementations, range limits 550 can be placed upon all of the categories 510. Thus, the local security agent could prevent users from setting the mixer bar representation 540 outside of the provided range 550. In additional implementations, the ranges may not be shown on the graphical user interface 500. Instead, the range 550 could be abstracted out of the graphical user interface 500 and all of the settings would be relative settings. Thus, the category 510 could display and appear to allow a full range of settings, while transforming the setting into a setting within the provided range. For example, the "Virus" category 510 range 550 is provided in this example as being between level markers 8 and 13. If the graphical user interface 500 were set to abstract the allowable range 550 out of the graphical user interface 500, the "Virus" category 510 would allow setting of the mixer bar representation 540 anywhere between 0 and 14. However, the graphical user interface 500 could transform the 0-14 setting to a setting within the 8 to 13 range 550. Thus, if a user requested a setting of midway between 0 and 14, the graphical user interface could transform that setting into a setting of midway between 8 and 13.

In some implementations, control setting ranges can be limited by system performance. For example, if a system has a given processing power, the system might not have the capacity to provide for certain control settings. In some implementations, a system performance control setting can be provided. The system performance control setting can be used to provide an administrator or user with a representation of the system performance of the network based on the given security and policy control settings. For example, if each of the security and policy control settings is adjusted to a maximum level, the system performance control setting might be at lower than a maximum level.

In some implementations, adjustment of the system performance setting can cause the security and/or policy control settings to be adjusted. For example, if the security and policy control settings are set at the highest levels, and the administrator attempts to adjust the system performance setting to the maximum level, the interface can reduce the security and policy control settings to provide for maximum performance. In some implementations, the ratio between the settings can be maintained when the system performance control setting is adjusted.

In some implementations, a user can create his/her own categories for classifications. In such implementations, a tuner interface can allow the user or administrator to provide a catalog of files (e.g., documents, messages, etc.) that are representative of a group of documents for which the user intends to create a classification. A message classification engine can examine the documents and derive any relationships between the documents and derive the characteristics associated with the group of documents. For example, a user might determine that all unsolicited traffic is unwanted. Such a user can create a single classification for unsolicited traffic, which can comprise any of a number of classifications associated with the and provide those documents that belong to the classification to a message classification engine. The message classification engine can thereby create a classification and allow the user to tune the tolerance associated with the classification.

Figure 6:
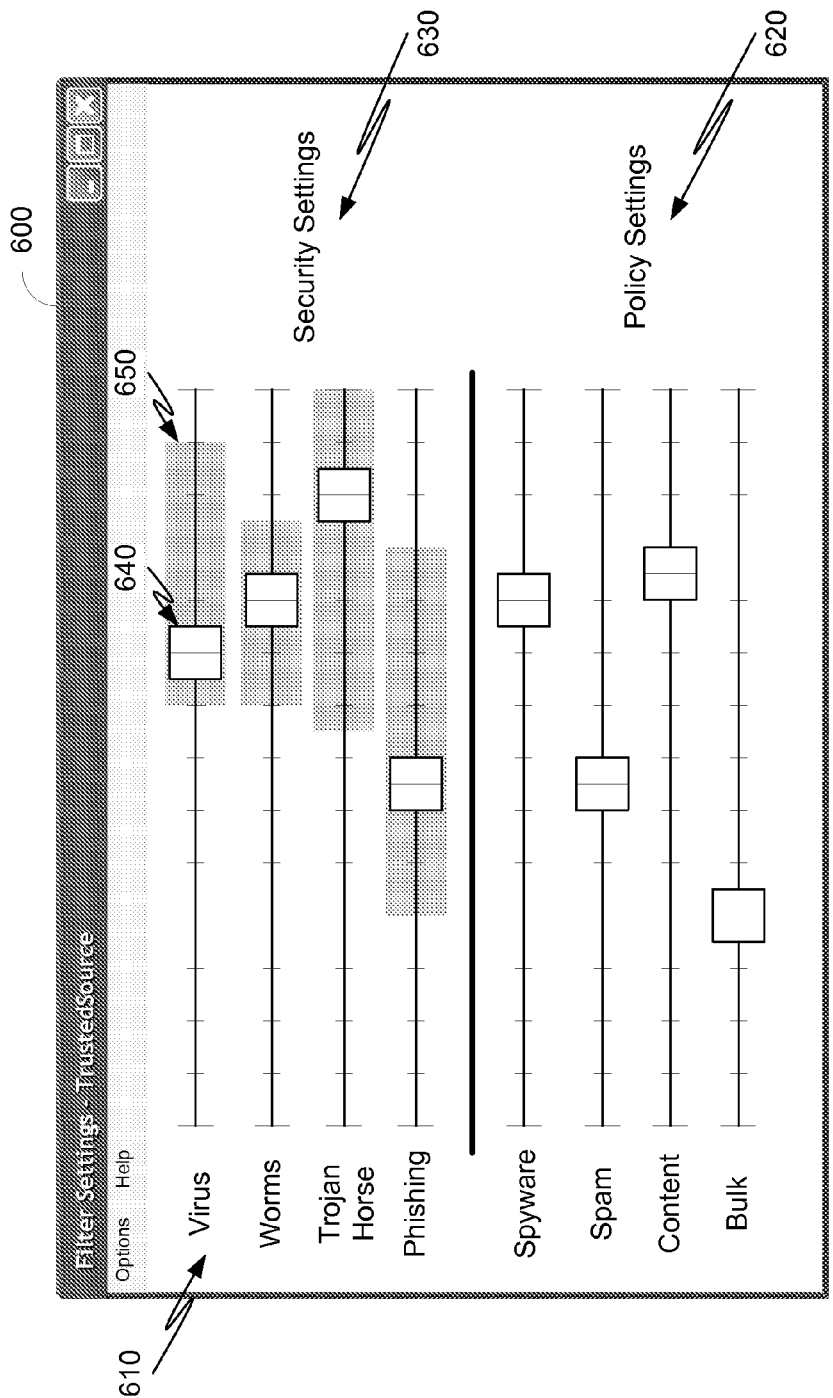
FIG. 6 is a screen shot of another example graphical user interface used to adjusting the settings of a communications filter.

FIG. 6 is another example graphical user interface 600 for adjusting the settings of a filter associated with a reputation server. In some implementations, the graphical user interface 600 can allow the user to customize the settings view. For example, in the user interface 600 a plurality of sliders 640 can be moved horizontally to adjust policy control settings 620 and/or security control settings 630. The categories 610 can be displayed to provide the user with a list of categories corresponding to each of the sliders 640. In some implementations, the sliders can be limited to stay within a range 650 provided, for example, by an administrator.

In other implementations, the graphical user interface might provide knob representations, operable to provide the user with an interface for tuning security and/or policy control settings by turning the knob representations. Other interface abstractions are possible.

Figure 7:
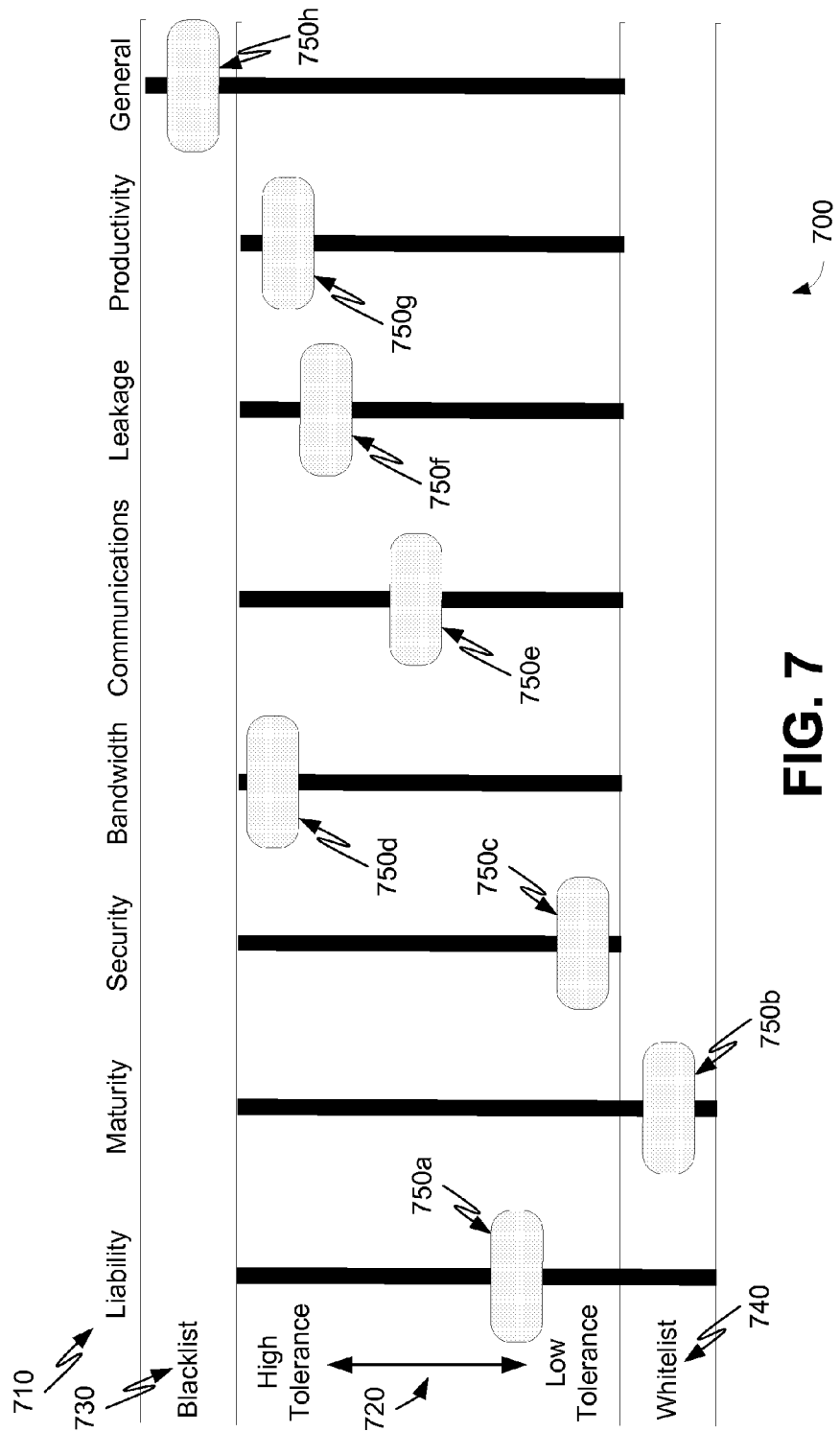
FIG. 7 is a block diagram of another example interface used to adjust the settings of a communications filter.

FIG. 7 is a block diagram of another example interface 700 used to adjust the settings of a communications filter. In some implementations, the interface 700 can include a number of risk classifications 710. In some examples, the risk classifications can include, among others: liability, maturity, network security, bandwidth exhaustion, communication freedom, information security, low productivity and general information.

The interface 700 can include a scale representation 720 against which the risk classifications 710 can be adjusted. In some implementations, adjusting a control setting to high tolerance on the scale 720 can allow more types of information associated with that activity category to be accessed, while adjusting the control setting to low tolerance on the scale 720 can prevent users from engaging in activities that might include some level of risk to an associated network.

In some implementations, the scale 720 can also include a blacklist setting representation 730 and a whitelist setting representation 740. The blacklist setting representation 730 can provide more freedom to users by allowing access to any types of activities associated with a risk classification 710 except where the activity is prohibited by a blacklist entry. The whitelist setting representation 740 can provide more limited access to activities associated with a risk classification 710 by blocking all activities associated with that risk classification 710 except where the activity is included on a whitelist associated with the risk classification 710.

In some implementations, the interface 700 can include a number of control setting representations 750a-h. The control setting representations 750a-h can represent risk classifications 710 including liability, maturity, network security, bandwidth exhaustion, communication freedom, information security, low productivity and general information, respectively. The various control settings can enable a user or administrator to adjust control settings associated with the respectively risk classification 710.

In some implementations, a liability risk classification setting 750a can define a user's risk tolerance with respect to legal liability. In various instances, an employee might engage in network activity could subject an employer to legal liability. For example, if a user is sending adult content to other employees, the employee may be subjecting the employer to liability for sexual harassment charges on the part of the recipient. In other examples, the employee may be engaging in criminal activities that could subject the employer to liability, such as defrauding customers under the color of his duties to the employer or embezzling money.

In some implementations, a maturity risk classification setting 750b can include content that may harm the emotional development of children. For example, in environments where children may be present, an administrator might want to limit access to content that contains mature content. In other examples, an environment such as a workplace might not include children. Such workplace environments can provide higher tolerance to mature content. In various examples, mature content can include (in no particular order) such concepts as violence, gambling, drugs, profanity, or nudity, among many others.

In some implementations, network security risk classification settings 750c can include filtering content such as sources of malware that might damage computer software, circumvent filtering policy or expose confidential data. Any network activity can expose network assets to security risks. However, a goal of a network is not to block all network traffic, but to limit the risks associated with the activities engaged in by users.

In some implementations, a bandwidth exhaustion risk classification setting 750d can include filtering risks that an application may exhaust the bandwidth of the network. Some applications, such as for example, streaming media, can use an inordinate amount of bandwidth and can cause greater risk that the network may not have enough bandwidth to serve new applications. For example, if a business is served by a digital subscriber line (DSL) connection, multiple streaming media connections (such as, e.g., streaming video, web phone, etc.) may increase the risk that an important teleconference connection cannot be established. In other examples, a business might have a T3 network connection. In such examples, bandwidth is probably less of a concern for an administrator or user based upon the available bandwidth. As such, an user/administrator can track the usage of the network and set the risk levels appropriately based upon historical usage.

In some implementations, communication freedom risk classification setting 750e can include filtering the types of applications with which users can communicate with other users. For example, many web mail programs and web phone are difficult to manage risk because they allow the user to communicate information directly to other users outside of the organization. Thus, some administrators can provide limits to the types of applications that can be used by network entities.

In some implementations, information security risk classification setting 750f can include filtering risks that a user or application exposes confidential company information to users outside of the company. For example, peer-to-peer file sharing can allow users outside of a business access to files on a business computer. In other examples, phishing websites and/or applications can allow external users to receive data associated with employees of a company, and even allow access to business information. In some implementations, productivity risk classification setting 750g can include filtering risks that employees are using the network resources for non-productive uses. Many companies do not wish to limit access to such resources for fear that employees would feel untrusted and not develop loyalty to the company. However, many websites and/or applications can reduce the productivity of a company's employees. Thus, the company might want to reduce total use of such websites and/or applications, while not eliminating access to these sites and/or applications.

In some implementations, general information risk classification setting 750h can include filtering of fact based sites that allow the user to review information about various subjects. If an administrator sets the control setting for the general information category at a low tolerance, the policy engine will limit the information accessed to those categories of information useful for their job, rather than information on a location of the user's polling place or science websites describing why the sky is blue. If the control settings are adjusted to high tolerance (or blacklist), the policy engine will allow the user to access most types of general information. So, if there is a site with lots of information that has some risk that might be blocked by your Bandwidth or Propriety setting, over-ride those other risks to let this site through.

In various implementations, other risk classifications can be used.

Figure 8:
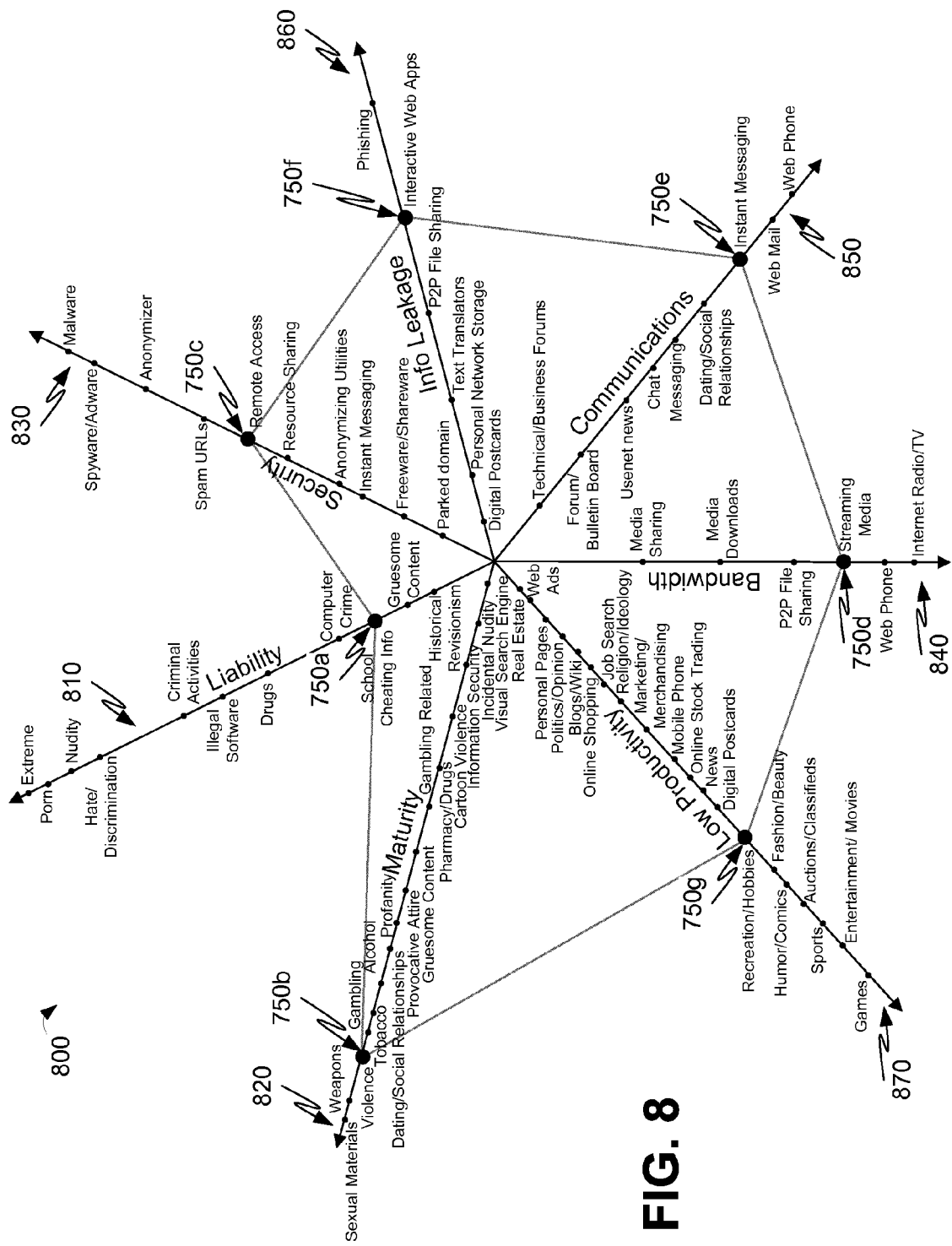
FIG. 8 is a block diagram of another example interface used to adjust the settings of a communications filter.

FIG. 8 is a block diagram of another example interface used to adjust the settings of a communications filter. In various implementations, a number of risk classifications can be identified. Risk classifications can be mapped onto a multi-dimensional risk space 800. The multi-dimensional risk space can be used, in some implementations, to aid a user or administrator in determining how to set and apply policy for an associated network (or a network device).

In some implementations, each of the risk classifications can be represented by an axis 810-870 and can be identified as orthogonal (or substantially orthogonal) to each other. In such implementations, each of the axes 810-870 associated with the risk classification is substantially independent of the other axes and can be envisioned to lie at right angles to the other axes. The axes 810-870 can be used to map activities based upon the risk associated with that activity to a respective risk classification. For example, illegal activity can imply liability issues for a company. In some instances, an activity can imply multiple risk classifications. For example, an employee viewing porn might imply a liability risk and a maturity risk if there are young people that might be affected by the content (such as a children's television production company).

The multi-dimensional risk space 800 can also include a number of control settings 750a-g. In some implementations, the multi-dimensional risk space can be provided as a companion interface for a slider interface (e.g., interface 700 of FIG. 7). In these implementations, the control settings 750a-g can provide an indication of the types of activity being filtered by the various settings made with respect to the slider interface.

In other implementations, the multi-dimensional risk space 800 can be provided as a primary control setting interface for a filtering module (e.g., filtering module 250 of FIG. 2). In such implementations, an administrator and/or user can adjust the control settings 750a-g by moving the a control setting 750a-g away from an origin or toward an origin of the respective axis 810-870 associated with the control setting 750a-g. For example, if an administrator places a high priority on network security, the administrator could move a network security control setting 750c toward the origin of a network security axis 830. In other examples, if an administrator and/or user place a low priority on network bandwidth (e.g., because there is plenty of available bandwidth), the administrator and/or user could move a bandwidth control setting 750d away from the origin of a bandwidth axis 840. Other axes can be used.

In still further implementations, total risk can be calculated based upon an area associated with an activity. For example, based upon the multi-dimensional space 800, it can be identified that there might exist an activity that involves more than two different risks. In such instances, a filter can compute an area defined by the activity on the risk classification axes 810-870 and calculate a total risk associated with the activity based upon the risks implicated by the activity on each of the implicated risk classification axes 810-870. In such implementations, a user and/or administrator can define a maximum total level of risk acceptable to the user and/or administrator, and the calculated total risk of an activity can be compared to the maximum total level of acceptable risk to determine whether to allow an activity.

Figure 9:
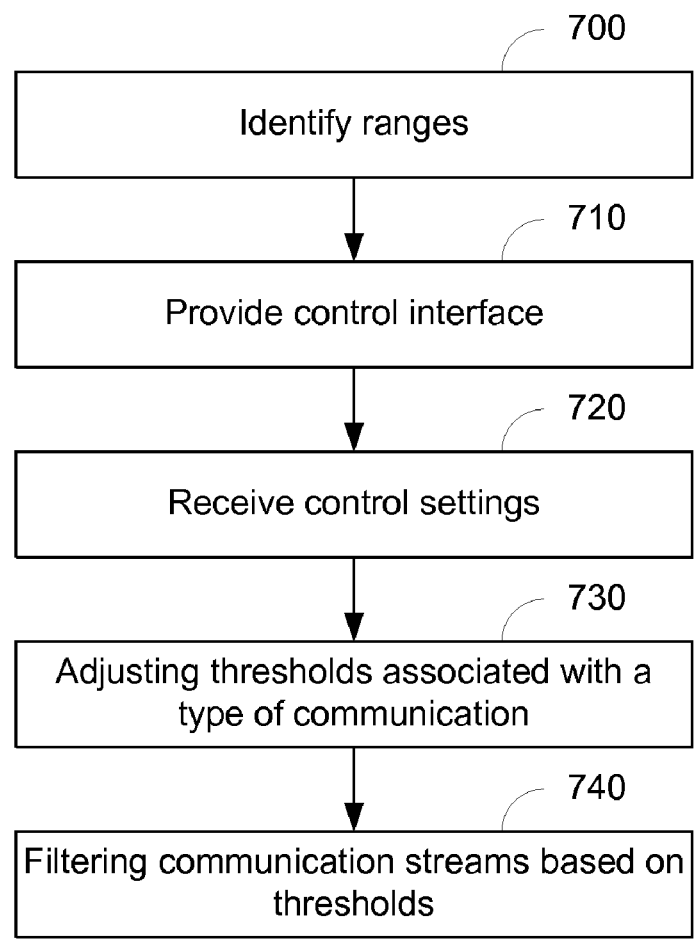
FIG. 9 is a flowchart of an example method for adjusting filter settings associated with a network security agent.

FIG. 9 is a flowchart illustrating an example method for adjusting filter settings associated with a network security agent. At stage 900, ranges are identified. The ranges can be identified, for example, by a security agent (e.g., security agent 100 of FIG. 1). In various implementations, the identified ranges can provide a range within which the control setting can be adjusted. In some implementations, the range can be depicted in a user interface environment. In other implementations, the control setting can be a weighting associated with a classification category within a range of weightings, whereby the setting comprises a percentage operator (e.g., multiplier) upon a default setting. In some examples, an administrator can be allowed to set a maximum multiplier and a minimum multiplier, and the maximum and minimum multipliers comprise the range within which the control setting can be adjusted. In still further implementations, the control setting can be a direct adjustment of a threshold associated with a classification and the range can be a reflection of a minimum and maximum threshold associated with the classification. In some implementations, the range can be hard coded into the security agent. In some such implementations, an administrator can be provided authorization to provide further limitations within the range allowed by the security agent.

At stage 910, a control interface is provided. The control interface can be provided, for example, by a security agent (e.g., security agent 100 of FIG. 1) in conjunction with a user interface. In some implementations, the control interface can include a plurality of sliders operable to adjust control settings associated with a communications filter. For example, the control interface can provide an equalizer representation to the user, enabling the user to adjust a plurality of detection settings for various classifications of communications that can be filtered by a communications filter.

At stage 920, control settings can be received. The control settings can be received, for example, by a security agent (e.g., security agent 100 of FIG. 1) in conjunction with a user interface. In some implementations, the control settings are received based upon a user accessing the control interface and adjusting a control representation associated with the control interface. In various implementations, the control settings can provide direct adjustment of classification thresholds. In other implementations, the control settings can operate as a percentage operator on a default bias associated with a classification. For example, a default setting could represent the identity of a default bias, while adjusting the control setting higher or lower could multiply or divide the default bias, respectively.

At stage 930, thresholds associated with a type of communication can be adjusted. The thresholds can be adjusted, for example, by a security agent (e.g., security agent 100 of FIG. 1) in conjunction with a user interface. In some implementations, the thresholds associated with a type of communication can define the level of similarity required between a subject communication and communications previously associated with the type before a subject communication will be classified as belonging to that communication type. For example, a high threshold might require many similarities between the subject communication and classified communications before classifying the subject communication as belonging to the type. Similarly, a low threshold might require only a few similarities between the subject communication and previously received communications of the classification type before classifying the subject communication as belonging to the type. In various implementations, the similarities between communications can be derived based upon multiple attributes associated with the communication, including similarities to known legitimate communications.

In other implementations, stage 930 can be replaced by a stage operable to adjust a bias associated with a type of communication. For example, the weightings associated with specific attributes or characteristics of a subject can be adjusted to provide results to a profiler. The weightings can cause a profiler to associate a communication with a particular classification based upon certain attributes of the communication being amplified with respect to other attributes.

At stage 940, communications can be filtered based on thresholds. The communications can be filtered, for example, by a security agent (e.g., security agent 100 of FIG. 1), in conjunction with a communications filter. In some implementations, the filter can drop communications of certain classifications. In other implementations, the filter can quarantine communications for further inspection. In still further implementations, the filter can mark communications based upon a classification. In some such implementations, the markings associated with a communication can be made available to the user and/or programs associated with the user's computer.

In alternative implementations, stage 940 can be replaced by filtering the communications based on classifications identified by results of the profiler, and as biased based on the control settings. For example, a user might request that all communications be marked based upon a classification, or that certain classifications be dropped, quarantined, or otherwise delayed.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods'operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise.

Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A system comprising:
    a communications interface, implemented as part of a system comprising one or more computing devices, operable to receive data associated with a network;
    a risk assessment module, implemented as part of the system comprising one or more computing devices, operable to parse the data to determine a particular type of sender or recipient activity associated with the data and to identify a sender and a recipient associated with the data based upon an application of a plurality of tests to the data, the risk assessment module being operable to assign a total risk level to the data based upon the sender or recipient and one or more risks associated with the particular type of sender or recipient activity, wherein the total risk level is calculated based upon the one or more risks and a tolerance for each of the one or more risks;
    a filtering module, implemented as part of the system comprising one or more computing devices, operable to filter the data based upon the total risk level assigned to the data and a maximum total acceptable level of risk, the maximum total acceptable level of risk being indicated by a policy associated with the network; and
    a control settings interface, implemented as part of the system comprising one or more computing devices, operable to facilitate setting of the policy, the control settings interface including a plurality of orthogonal risk categories associated with various activities, wherein each risk category comprises one or more types of sender or recipient activities.

2. The system of claim 1, wherein the control settings interface comprises a slider interface facilitating the movement of control setting representations associated with the plurality of orthogonal risk categories.

3. The system of claim 2, wherein the control settings interface is operable to allow a network administrator to move control setting representations along a plurality of axes respectively associated with the orthogonal risk categories.

4. The system of claim 3, wherein each of the axes include example sender or recipient activities that correspond to risk levels associated with the example sender or recipient activities.

5. The system of claim 4, wherein the example sender or recipient activities are associated with a respective risk level on an associated axis.

6. The system of claim 3, wherein the plurality of axes are parallel to each other.

7. The system of claim 3, wherein the plurality of axes share an origin.

8. The system of claim 3, wherein the orthogonal risk categories comprise one or more of a liability category, a maturity category, a security category, bandwidth category, a communications category, an information security category, or a productivity category.

9. The system of claim 3, wherein the slider interface includes a plurality of ranges, each of the ranges being associated with a respective control setting representation within which a control setting associated with a risk category, the risk category being one of the orthogonal risk categories, can be adjusted.

10. The system of claim 3, wherein the slider interface comprises a blacklist setting associated with a particular risk category from among the orthogonal risk categories, whereby only entities on a blacklist associated with the particular risk category are blocked.

11. The system of claim 3, wherein the slider interface comprises a whitelist setting associated with a particular risk category from among the orthogonal risk categories, whereby only entities on a whitelist associated with the particular risk category are allowed.

12. A computer-implemented method comprising:
    receiving data associated with a network;
    parsing, by one or more computer devices, the data to determine a particular type of sender or recipient activity associated with the data and to identify a sender and a recipient associated with the data based upon an application of a plurality of tests to the data, and assigning a total risk level to the data based upon the sender or recipient and one or more risks associated with the particular type of sender or recipient activity, wherein the total risk level is calculated based upon the one or more risks and a tolerance for each of the one or more risks;
    filtering, by the one or more computer devices, the data based upon the total risk level assigned to the data and a maximum total acceptable level of risk, the maximum total acceptable level of risk being indicated by a policy associated with the network; and
    setting the policy including a plurality of orthogonal risk categories associated with various activities, wherein each risk category comprises one or more types of sender or recipient activities.

13. The computer-implemented method of claim 12, further comprising providing a slider interface facilitating adjustment of the policy through a plurality of control setting representations associated with the plurality of orthogonal risk categories.

14. The computer-implemented method of claim 13, wherein the slider interface is operable to enable a network administrator to move control setting representations along a plurality of axes respectively associated with the orthogonal risk categories.

15. The computer-implemented method of claim 14, wherein a plurality of example sender or recipient activities are disposed along each of the axes at locations that correspond to risk levels associated with each of the example sender or recipient activities, respectively.

16. The computer-implemented method of claim 15, wherein each example sender or recipient activity is associated with a respective risk level on an associated axis.

17. The computer-implemented method of claim 14, wherein the plurality of axes are disposed parallel to each other.

18. The computer-implemented method of claim 14, wherein the plurality of axes share an origin.

19. The computer-implemented method of claim 14, further comprising associating a plurality of ranges with a respective control setting representation within which a control setting associated with the risk category, the risk category being one of the orthogonal risk categories, can be adjusted.

20. The computer-implemented method of claim 14, further comprising providing a blacklist setting associated with a particular risk category from among the orthogonal risk categories, whereby only entities on a blacklist associated with the particular risk category are blocked.

21. The computer-implemented method of claim 14, further comprising providing a whitelist setting associated with a particular risk category from among the orthogonal risk categories, whereby only entities on a whitelist associated with the particular risk category are allowed.

22. A computer-readable non-transitory medium storing instructions that are executable by one or more processing devices, and upon such execution cause the one or more processing devices to facilitate processes comprising:

receiving data associated with a network;

parsing the data to determine a particular type of sender or recipient activity associated with the data and to identify a sender and a recipient associated with the data based upon an application of a plurality of tests to the data, and assigning a total risk level to the data based upon the sender or recipient and one or more risks associated with the particular type of sender or recipient activity, wherein the total risk level is calculated based upon the one or more risks and a tolerance for each of the one or more risks;

filtering the data based upon the total risk level assigned to the data and a maximum total acceptable level of risk, the maximum total acceptable level of risk being indicated by a policy associated with the network; and setting the policy including a plurality of orthogonal risk categories associated with various activities, wherein each risk category comprises one or more types of sender or recipient activities.

\* \* \* \* \*